(12) United States Patent
Saito et al.

(10) Patent No.: US 8,385,038 B2
(45) Date of Patent: Feb. 26, 2013

(54) CIRCUIT BREAKER SWITCHING CONTROL SYSTEM

(75) Inventors: Minoru Saito, Kanagawa-ken (JP); Hiroyuki Maehara, Tokyo (JP); Osamu Hosokawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 216 days.

(21) Appl. No.: 12/732,562

(22) Filed: Mar. 26, 2010

(65) Prior Publication Data

US 2010/0254060 A1    Oct. 7, 2010

(30) Foreign Application Priority Data

Apr. 3, 2009 (JP) ................. P2009-090859

(51) Int. Cl.
*H02H 3/027* (2006.01)
*H02H 3/08* (2006.01)
(52) U.S. Cl. ............... 361/115; 361/94; 361/96; 361/97
(58) Field of Classification Search .......... 361/115, 361/94, 96, 97
See application file for complete search history.

(56) References Cited

U.S. PATENT DOCUMENTS

| | | | |
|---|---|---|---|
| 5,644,463 A * | 7/1997 | El-Sharkawi et al. | 361/94 |
| 5,926,089 A * | 7/1999 | Sekiguchi et al. | 340/500 |
| 6,172,863 B1 * | 1/2001 | Ito et al. | 361/79 |
| 7,492,163 B2 * | 2/2009 | Restrepo et al. | 324/536 |
| 8,018,097 B2 * | 9/2011 | Saito et al. | 307/112 |

OTHER PUBLICATIONS

Hamada et al.,"RDDS (Rate of Decrease of Dielectric Strength) Measurement for Gas Circuit Breaker" in Transmission and Distribution Conference; Feb. 19, 2003, vol. 3, pp. 1755-1759.*

* cited by examiner

*Primary Examiner* — Rexford Barnie
*Assistant Examiner* — Zeev V Kitov
(74) *Attorney, Agent, or Firm* — Oblon, Spivak, McClelland, Maier & Neustadt, L.L.P.

(57) ABSTRACT

The system of the invention includes a circuit breaker switching control section (100) and a setting control section (700) connected therewith through a communication network (500). The circuit breaker switching control section (100) transmits a circuit breaker state quantity acquired by a signal input section (120) through the communication network to a set value calculation section (740) of the setting control section (700). The set value calculation section (740) of the setting control section calculates a set value to be set in the switching control section (100) of the circuit breaker, using the state quantity of the circuit breaker that was transmitted thereto. The setting control section (700) transmits to the circuit breaker switching control section the set value calculated by the set value calculation section (730) through the communication network. A switching control calculation processing section (140) provided in the switching control section of the circuit breaker corrects the circuit breaker switching actuation time in accordance with this set value and calculates a delay time in respect of the zero-cross point in accordance with this corrected switching actuation time and power system period.

8 Claims, 10 Drawing Sheets

CIRCUIT BREAKER SWITCHING CONTROL SYSTEM

CROSS-REFERENCE TO RELATED APPLICATION

This application claims benefit of priority from Japanese application number JP 2009-90859 filed Apr. 3, 2009, the entire contents of which are incorporated by reference herein.

BACKGROUND OF THE INVENTION

1. Field of the Invention

The present invention relates to a circuit breaker switching control system for turning on or turning off a circuit breaker at a desired phase of the power system voltage or main circuit current. In particular, it relates to technology for calculating the delay time of the power system voltage or main circuit current with respect to the zero-cross point, based on the circuit breaker switching actuation time and power system period, and for performing circuit breaker switching operation in accordance with this delay time.

2. Description of the Related Art

Techniques for controlling the opening or closing timing of a power circuit breaker in order to prevent generation of transient phenomenon in power systems or power equipment are already known. Such techniques for controlling the opening or closing timing of a circuit breaker are termed "synchronized switching control". An example is ""Controlled switching of HVAC circuit circuit breakers. Guide for application lines, reactors, capacitors, transformers. SC13", ELECTRA No. 183 P. 43 (1999)" (hereinbelow referred to as non-patent reference 1)". In such a device that performs synchronized switching control, the closing or closing actuation time of the circuit breaker is detected and a synchronization delay time in respect of the opening or closure command signal of the circuit breaker is calculated, and the output timing of the opening or closure command signal is controlled in accordance with this calculated delay time.

However, the opening actuation time and closing actuation time of the circuit breaker vary depending on environmental conditions such as the ambient temperature or control voltage of the circuit breaker. The necessity of a function for estimating variation of the opening actuation time and closing actuation time in a device that performs synchronized switching control of a circuit breaker is discussed in non-patent reference 1.

For example, in the prior art disclosed in Laid-open Japanese Patent Application No. Tokkai 2001-57135 (hereinbelow referred to as patent reference 1), the variation of the opening actuation time or closing actuation time of the circuit breaker with respect to the control voltage is found at various different ambient temperatures, and The temperature characteristic and control voltage characteristic of the circuit breaker actuation time are thereby determined. The variation of the opening actuation time and closing actuation time of the circuit breaker that is the subject of such estimation on actuation is then estimated, using this temperature characteristic and control voltage characteristic, the control voltage of the circuit breaker that is the subject of such estimation, and the detected value of the ambient temperature. Also, in the prior art disclosed in patent reference 1, the variation of the opening actuation time or closing actuation time of the circuit breaker (this is called the actuation interval characteristic of the circuit breaker) is estimated, using the actuation interval of the circuit breaker.

Also, in the prior art disclosed in Laid-open Japanese Patent Application No. Tokkai 2001-135205 (hereinbelow referred to as patent reference 2), an opening actuation time correction table and closing actuation time correction table are created, based on environmental conditions that are measured beforehand, such as for example the circuit breaker control voltage and ambient temperature. The items recorded in these correction tables are one instance of the circuit breaker actuation time temperature characteristic and control voltage characteristic. The opening actuation time and closing actuation time are then estimated by correcting the standard opening actuation time and standard closing actuation time under the standard environmental conditions, using the opening actuation time correction table and closing actuation time correction table. If the circuit breaker operating mechanism is based on a hydraulic drive system, the opening actuation time and closing actuation time of the circuit breaker are affected by the hydraulic pressure. It is therefore also necessary to estimate the variation produced by the hydraulic pressure (this is called the circuit breaker hydraulic pressure characteristic).

However, in order to estimate the changes in the circuit breaker opening actuation time or closing actuation time based on the circuit breaker ambient temperature (hereinafter sometimes may be called the ambient temperature of the circuit breaker, others are the same), control voltage, operating hydraulic pressure and actuation interval etc, as in the prior art of patent reference 1 or patent reference 2, characteristic data such as the circuit breaker temperature characteristic, control voltage characteristic, hydraulic pressure characteristic and actuation interval characteristic, are necessary. Although, for these circuit breaker characteristic data, typically the same data can be employed if the model of circuit breaker used is the same, when the model of circuit breaker is different, the characteristic data are different for each model. Consequently, for each model of circuit breaker, various types of characteristic data must be measured beforehand in the model testing etc that is performed at the development stage, and these characteristic data must then be set beforehand as set values in the circuit breaker synchronized switching control device. By "the same model" is meant that the electrical characteristics and mechanical characteristics etc that are required in synchronized switching control are the same, excluding individual manufacturing variations.

Also, as stated in patent reference 1 etc, control taking into account the pre-arcing characteristic of the circuit breaker in synchronized closing control is indispensable. The pre-arcing characteristic must be calculated using the rate of decay of dielectric strength (RDDS), which is different for each model of circuit breaker. Consequently, the rate of decay of dielectric strength (RDDS) must be measured beforehand in the model testing etc that is performed on circuit breaker development, and this rate of decay of dielectric strength (RDDS) set beforehand in the circuit breaker synchronized switching control device.

If the manufacturer of the circuit breaker main unit and the manufacturer of the circuit breaker synchronized switching control device are the same, it is easy to set the necessary data such as the temperature characteristic, control voltage characteristic, hydraulic characteristic, actuation interval characteristic and rate of decay of dielectric strength (RDDS) etc of the circuit breaker in question in the synchronized switching control device of the circuit breaker prior to shipping. However, these data are typically difficult to acquire by a third party other than the manufacturer of the circuit breaker main unit. Consequently, when the manufacturer of the circuit breaker main unit and the manufacturer of the circuit breaker synchronized switching control device are different, it is difficult to set these data beforehand in the synchronized switching control device of the circuit breaker prior to shipping.

Furthermore, even when the manufacturer of the circuit breaker main unit and the manufacturer of the circuit breaker synchronized switching control device are the same, when for example a synchronized switching control device is added to an already-installed old circuit breaker, data such as the temperature characteristic, control voltage characteristic, hydraulic pressure characteristic, actuation interval characteristic and rate of decay of dielectric strength (RDDS) are not necessarily all available. Even if all the data are available, the precision of the data may be insufficient. In such cases, the models of circuit breaker with which a synchronized switching control device may be employed are restricted. Consequently, it is found that the application of a synchronized switching control device to an already-installed circuit breaker is difficult, or that the synchronized switching control device must be replaced when the circuit breaker is replaced.

Also, considered from the point of view of a user such as a power company, there is a possibility of economic disadvantage associated with the fact that, in power systems in which synchronized switching control is necessary, the purchasing source for the circuit breaker main unit or circuit breaker synchronized switching control device, or both of these, is restricted beforehand.

Even for circuit breakers of the same model, there are individual differences between circuit breakers in regard to the opening actuation time and closing actuation time under the standard conditions (typically corresponding to the opening actuation time and closing actuation time under the rated conditions) due to factors such as manufacturing variation. Consequently, the opening actuation time and closing actuation time must be measured for each circuit breaker in for example a shipping test and these data must be set in the synchronized switching control device of the circuit breaker prior to commencement of operation of the substation.

However, the opening actuation time and closing actuation time of the circuit breaker may change over a period of years, due to the effect of the number of times of circuit breaker actuation. Also, the rate of decay of dielectric strength (RDDS) may change over a period of years due to the effect of for example the number of times of interruption of the fault current or the magnitude of the fault current that is interrupted. It is therefore necessary to revise the set values of the synchronized switching control device in regard to data such as the opening actuation time and closing actuation time and rate of decay of dielectric strength (RDDS) in response to change over a period of years of the circuit breaker main unit. However, such revision of the set values was difficult to perform in the case of a conventional synchronized switching control device.

SUMMARY OF THE INVENTION

The present invention was made in view of the above problems. Specifically, an object of the present invention is to provide a circuit breaker switching control system wherein, if data such as the circuit breaker temperature characteristic, control voltage characteristic, hydraulic pressure characteristic, actuation interval characteristic and rate of decay of dielectric strength (RDDS) are not available, these data can be separately measured and easily set in the circuit breaker synchronized switching control device.

A further object of the present invention is to provide a circuit breaker switching control system wherein the various items of data referred to above can easily be revised in accordance with data acquired after the commencement of operation. Yet a further object of the present invention is to provide a circuit breaker switching control system wherein the various items of data referred to above can easily be revised in response to changes in the circuit breaker over the years.

In order to achieve the objects described above, a circuit breaker switching control system according to the present invention comprising a circuit breaker switching control section and a setting control section connected with abovementioned circuit breaker switching control section through a communication network is constructed as follows.

Abovementioned circuit breaker switching control section comprises:

(a) a signal input section that inputs at least one electrical quantity of the power system voltage or main circuit current, a circuit breaker state quantity, and at least one signal of a circuit breaker opening command signal or closure command signal;

(b) a switching control calculation processing section that calculates the delay time with respect to the zero-cross point of the power system voltage or main circuit current, based on the circuit breaker switching actuation time and power system period, in order to turn on or turn off the circuit breaker with a desired phase of the power system voltage or main circuit current; and (c) a switching command control section that outputs in respect of the circuit breaker an opening command signal or closure command signal with a delay that is controlled in accordance with the delay time that is calculated by abovementioned switching calculation processing section.

Abovementioned setting control section comprises:

(d) a setting control processing section that performs setting control of a set value used to correct the switching actuation time of the circuit breaker, in respect of the switching control section of abovementioned circuit breaker;

(e) a display control processing section of the set value that is set by abovementioned setting control processing section; and (f) a set value calculation section that calculates abovementioned set value from the state quantity of the circuit breaker.

With the present invention constructed as above, by means of the circuit breaker switching control section and at setting control section having a construction as described above, (1) the switching control section of above-mentioned circuit breaker transmits the state quantity of the circuit breaker acquired by the signal input section to the set value calculation section of abovementioned setting control section through the communication network;

(2) the set value calculation section of above-mentioned setting control section calculates the set value is to be set in the switching control section of abovementioned circuit breaker using the circuit break state quantity that has thus been transmitted;

(3) abovementioned setting control section transmits the set value calculated by abovementioned set value calculation section through abovementioned communication network to abovementioned circuit breaker switching control section; and (4) the switching control calculation processing section that is provided in abovementioned circuit breaker switching control section corrects the switching actuation time of the circuit breaker in accordance with this set value and calculates a delay time with respect to the zero-cross point, in accordance with this corrected switching actuation time and power system period.

With a circuit breaker switching control system according to the present invention having a construction as described above, the state is acquired from the circuit breaker during operation, this data is transmitted to the setting control section through the network, and the setting control section calculates the set value for correcting the circuit breaker switching actuation time.

With the present invention, the set values necessary for calculation of the delay time in respect of the zero-cross point of the power system voltage or main circuit current can be determined in accordance with the state quantity that is acquired from the circuit breaker during operation. As a result, the need to acquire the characteristic values etc of the circuit breaker beforehand is eliminated, and determination of the set values becomes easy and precise.

DETAILED DESCRIPTION OF THE PREFERRED EMBODIMENTS

Embodiments of a circuit breaker switching control system according to the present invention are described below with reference to the drawings. "Ethernet", "Windows" and "Java" used in the various embodiments of the present invention are registered trademarks.

First Embodiment

[Layout]

Figure 1:
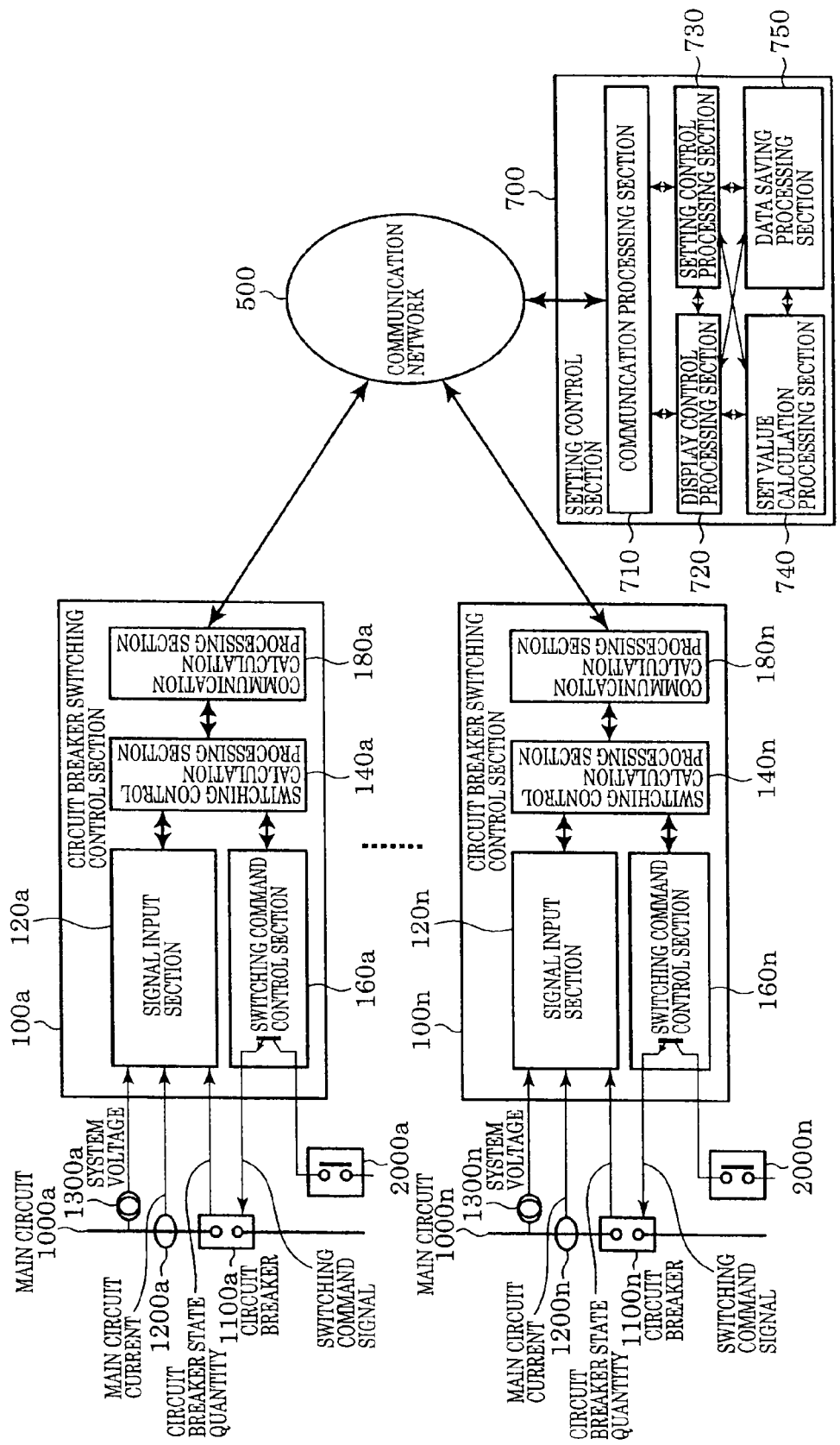
FIG. 1 is a system layout diagram of a circuit breaker switching control system according to a first embodiment of the present invention.

FIG. 1 is a system layout diagram of a circuit breaker switching control system according to a first embodiment of the present invention. In FIG. 1, 100a to 100n are circuit breaker switching control sections, 500 is a communication network, and 700 is a setting control section, these being the major constituent sections of a circuit breaker switching control system. Also, 1000a to 1000n are main circuits, 1100a to 1100n are circuit breakers, 1200a to 1200n are current transformers, and 1300a to 1300n are potential transformers (or instrumentation transformers). Other disconnecting switches (or interrupters) and grounding switches etc are not shown. The usual items of equipment constituting a substation switching device are connected with the main circuits 1000a to 1000n. 2000a to 2000n are upper-level devices, such as a protective relay device or BCU (Bay Control Unit).

Only a single phase is shown in FIG. 1, but the present invention may be applied to three-phase circuit breakers and other circuits. Hereinbelow, unless otherwise specified, the present invention is taken to be applied to a three-phase circuit or three-phase circuit breaker. The suffixes a to n of the symbols represent circuits a to n and will be omitted hereinbelow unless they are specially required in the description. These circuits a to n may be different circuits within the same substation or may be different circuits between mutually different stations. "Circuits" according to the present invention may refer to any circuits within the substation such as for example transmission line circuits, transformer circuits, reactor circuits, or capacitor bank circuits.

The main constituent parts of switching control system of a circuit breaker are described in more detail with reference to FIG. 1.

<Circuit Breaker Switching Control Section 100>

The circuit breaker switching control section 100 comprises a signal input section 120, switching control calculation processing section 140, switching command control section 160 and communication calculation processing section 180. The signal input section 120 inputs for example the power system voltage, main circuit current and various circuit breaker state quantities such as the circuit breaker temperature, control voltage, and operating pressure. The switching control calculation processing section 140 performs switching control calculation processing for turning on or turning off the circuit breaker in a desired phase of the power system voltage or main circuit current. The switching command control section 160 outputs to the circuit breaker 1100 an opening command signal whose delay is controlled or a closure command signal whose delay is controlled. The communication calculation processing section 180 exchanges various types of information such as state quantities of the circuit breaker with the setting control section 700 through the communication network 500.

Regarding the various constituent elements of the switching control section 100 of the circuit breaker, only one phase is illustrated in FIG. 1, but, in fact, the necessary constituents for controlling three-phase circuit breaker are of course present, and this applies in the same way in the description below, unless otherwise specially noted.

Figure 2:
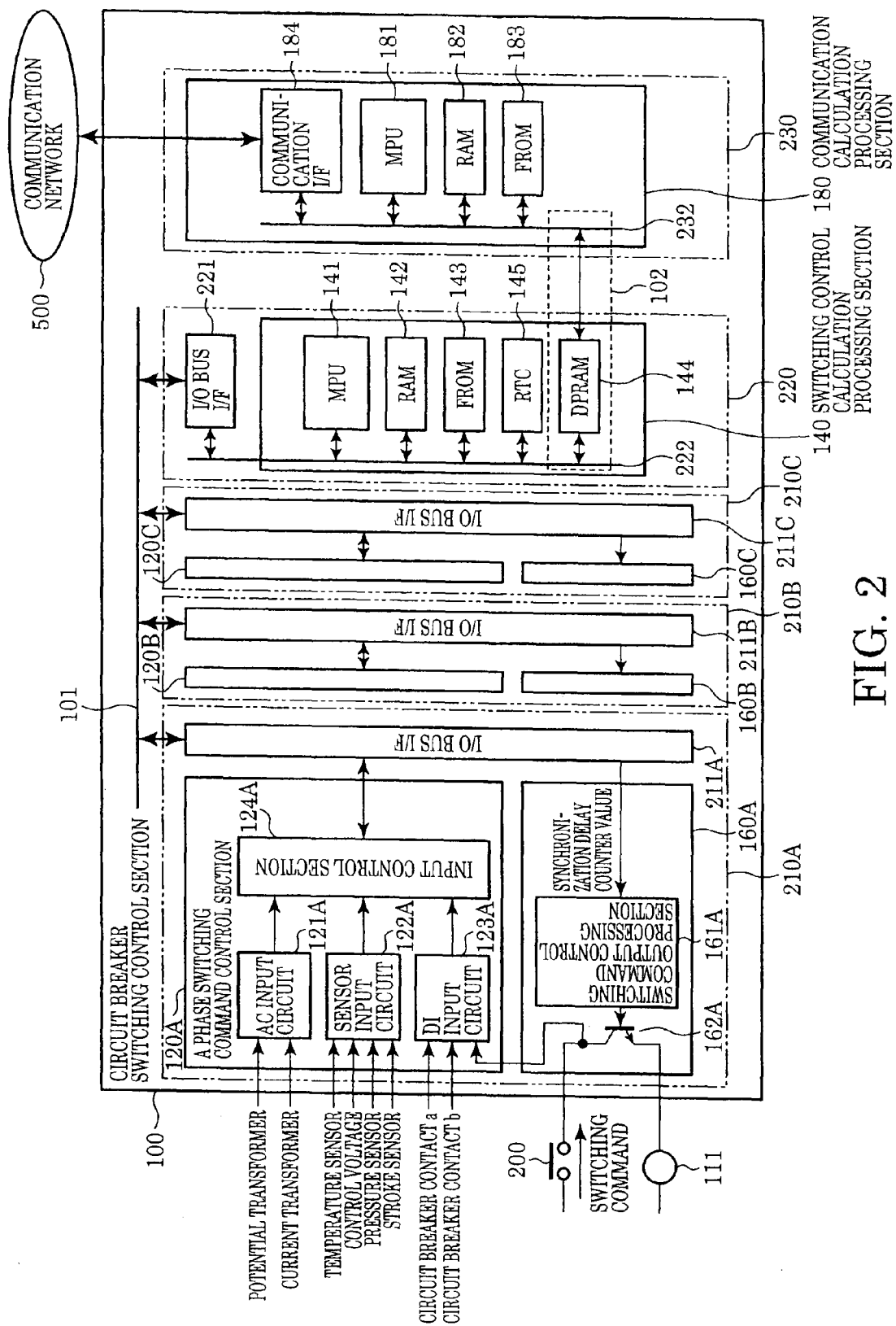
FIG. 2 is a detailed block diagram of a circuit breaker switching control section according to a first embodiment of the present invention.

FIG. 2 is a detailed block diagram of the circuit breaker switching control section 100. The circuit breaker switching control section 100 is described in further detail with reference to FIG. 2. In the embodiment of FIGS. 2, 210, 220 and 230, which are enclosed by the double-dotted chain lines, are the individual circuit boards on which the various constituent elements are mounted. Mutual connection between this circuit board 210, circuit board 220 and circuit board 230 is effected by means of an I/O bus 101 and DPRAM bus 102. The circuit board 210 is constituted by one circuit board for each phase: three such circuit boards 210_A, 210_B and 210_C are mounted in the circuit breaker switching control section 100.

The symbol suffixes _A, _B and _C respectively indicate the A phase, B phase and C phase, but if there is no particular need to distinguish between the A phase, B phase and C phase, the symbol suffixes _A, _B and _C are omitted. It should be noted that any construction of the constituent elements of the circuit breaker switching control section 100 in terms of circuit board layouts other than that of FIG. 2 could be adopted, so long as the function of the circuit breaker switching control section 100 described below is satisfied. Also, the mutual connection between the circuit boards could be constituted by connection means other than those shown in FIG. 2.

The constituent elements mounted on the circuit board 210 are the signal input section 120, switching command control section 160 and I/O bus interface 211. The signal input section 120 mounted on the substrate 210 is constituted by for example an AC input circuit 121, sensor input circuit 122, DI input circuit 123, and input control section 124. The main circuit current signal and power system voltage signal etc are input to the AC input circuit 121 from for example a current transformer 1200 and instrumentation transformer 1300. For example a circuit breaker control voltage signal, a temperature signal from a temperature sensor, a pressure signal from an operating pressure sensor and a stroke signal from a stroke sensor are input to the sensor input circuit 122 for measuring the state quantities of the circuit breaker.

The AC input circuit 121 and sensor input circuit 122 comprise for example an insulating circuit or analogue filter (typically a low-pass filter), sample-hold circuit, multiplexer and analogue-digital converter, not shown. This AC input circuit 121 and sensor input circuit 122 input as analogue information for example the main circuit current signal, power system voltage signal and sensor signals such as pressure signals, hold these for a prescribed sampling interval, and then convert these into digital quantities.

It should be noted that a circuit construction could be adopted in which for example the sample-hold circuit and multiplexer are omitted and an analogue-digital converter is provided for each input signal, or a construction could be adopted such as for example an analogue-digital converter incorporating a sample-hold circuit. Also, the input circuit construction could be altered, depending on the control algorithm adopted, without necessarily needing to input all the electrical quantities indicated in this embodiment, such as the main circuit current signal, power system voltage signal and sensor signals such as pressure signals.

The DI (digital) input circuit 123 inputs for example circuit breaker switching command signals from the circuit breaker contact a or circuit breaker contact b, or an upper level device 2000 such as a protective relay device or BCU and other digital signals. These input signals indicate the state quantities of the circuit breaker. The DI input circuit 123 inputs digital input quantities that are sampled with a prescribed sampling interval by a sample-hold circuit, not shown, or the like and held.

The input control section 124 is a logic circuit constituted by for example a PLD (Programmable Logical Device) or FPGA (Field Programmable Gate Array). The input control section 124 controls the actuation timing of the sample-hold circuits, multiplexer and analogue-digital converter of for example the AC input circuit 121 and sensor input circuit 122 and DI input circuit 123. The input control section 124 also controls data transmission when the main circuit current signal, power system voltage signal, sensor signals such as pressure, contact a or contact b of the circuit breaker, or digital data such as switching command signals are transmitted to the switching control calculation processing section 140 through the I/O bus interface 211.

The switching command control section 160 mounted on the circuit board 210 comprises for example a switching command output control processing section 161 and switching command output section 162.

The switching command output control processing section 161 is a logic circuit constituted by for example a PLD (Programmable Logical Device) or FPGA (Field Programmable Gate Array) and incorporates a hardware counter. This switching command output control processing section 161 receives a synchronization delay counter value that is transmitted from the switching control calculation processing section 140 via the I/O bus interface 211 and executes control of the counter with a prescribed synchronization delay with respect to the received count value. After this, this switching command output control processing section 161 outputs a trigger signal in respect of the switching command output section 162.

It should be noted that, although, in the construction of FIG. 2, a construction was adopted in which a hardware counter was incorporated in the switching command output control processing section 161, depending on the control algorithm adopted, the hardware counter could be dispensed with.

The switching command output section 162 is typically constituted by a semiconductor switch such as an FET or IGBT: ON actuation of this semiconductor switch is effected in response to the trigger signal from the switching command output control processing section 161. When ON actuation of the switching command output section 162 is performed, a switching command signal (circuit breaker drive current) of the circuit breaker under synchronized switching control flows to the circuit breaker drive coil 1110, performing opening or closing actuation of the circuit breaker.

A switching control calculation processing section 140 is mounted on the circuit board 220 as a constituent element. The switching control calculation processing section 140 comprises for example a switching control calculation MPU (microprocessor) 141, RAM 142, Flash ROM (or rewritable non-volatile memory such as an EEPROM) 143, DPRAM (dual port RAM) 144, or real-time clock 145: these are mutually connected through a local bus 222.

The local bus 222 is constituted by an ordinary parallel bus such as the independent parallel bus of the hardware employed, or PCI bus, compact PCI bus, or VME bus. The I/O bus interface 221 that is connected with the local bus 222 is the interface of the I/O bus 101 (typically a parallel transmission medium). This I/O bus 101 is a data transmission path for mutual communication of data between the switching control calculation processing section 140 and signal input section 120 and switching command control section 160.

The communication calculation processing section 180 is mounted on the circuit board 230 as a constituent element. The communication calculation processing section 180 comprises for example a communication calculation MPU (microprocessor) 181, RAM 182, Flash ROM (or rewritable non-volatile memory such as an EEPROM) 183, and a communication interface 184: these are mutually connected to a local bus 232.

The local bus 232 is constituted by an ordinary parallel bus such as the independent parallel bus of the hardware employed, or PCI bus, compact PCI bus, or VME bus. The communication interface 184 is an interface for connection with the communication network 500. It should be noted that, although, in FIG. 2, the communication calculation MPU 181 and communication interface 184 are connected through the local bus 232, they could be connected by a dedicated local bus.

The switching control calculation MPU 141 of the switching control calculation processing section 140 and the communication calculation MPU 181 of the communication calculation processing section 180 are connected through the DPRAM bus 102 in order to mutually exchange data. The DPRAM bus 102 effects connection through a DPRAM 144 between the local bus 222 of the switching control calculation processing section 140 and the local bus 232 of the communication calculation processing section 180. It should be noted that, although, in the construction of FIG. 2, a layout is adopted in which the DPRAM 144 is arranged at the switching control calculation processing section 140, the DPRAM 144 could be arranged at the communication calculation processing section 180. Also, instead of a layout employing a DPRAM, a dedicated parallel bus such as a PCI bus, compact PCI bus, or VME bus, or a dedicated serial bus could be employed.

The I/O bus 101 is the interface for mutual communication of data between the switching control calculation processing section 140 and the signal input section 120 and the switching command control section 160. The I/O bus 101 is typically a parallel transmission medium: an ordinary parallel bus such as a PCI bus, contact PCI bus or VME bus may be adopted, or an independent parallel bus of the hardware employed may be adopted. If an independent parallel bus is employed, it may be arranged for the switching control calculation processing section 140 to exchange the synchronization delay count value etc using a dedicated line.

It should be noted that, as a modified example of the construction of the circuit breaker switching control section 100, the same action and effects could be obtained by adopting a construction in which the functionality/construction of the circuit board 230 is included in the circuit board 220. A construction in which the functionality/construction of the circuit board 230 is included in the circuit board 220 may for example be a construction in which the switching control calculation processing section 140 and communication calculation processing section 180 are collected on a single circuit board, or in which a single common MPU is employed for the switching control calculation MPU 141 and communication calculation MPU 181. In this case, the RAM and FROM etc are shared, and a DPRAM is unnecessary. Also, as a further modified example of the construction of the circuit breaker switching control section 100, a construction may be adopted in which all or some of the I/O buses 101 are replaced by serial transmission media.

<Communication Network 500>

Figure 3:
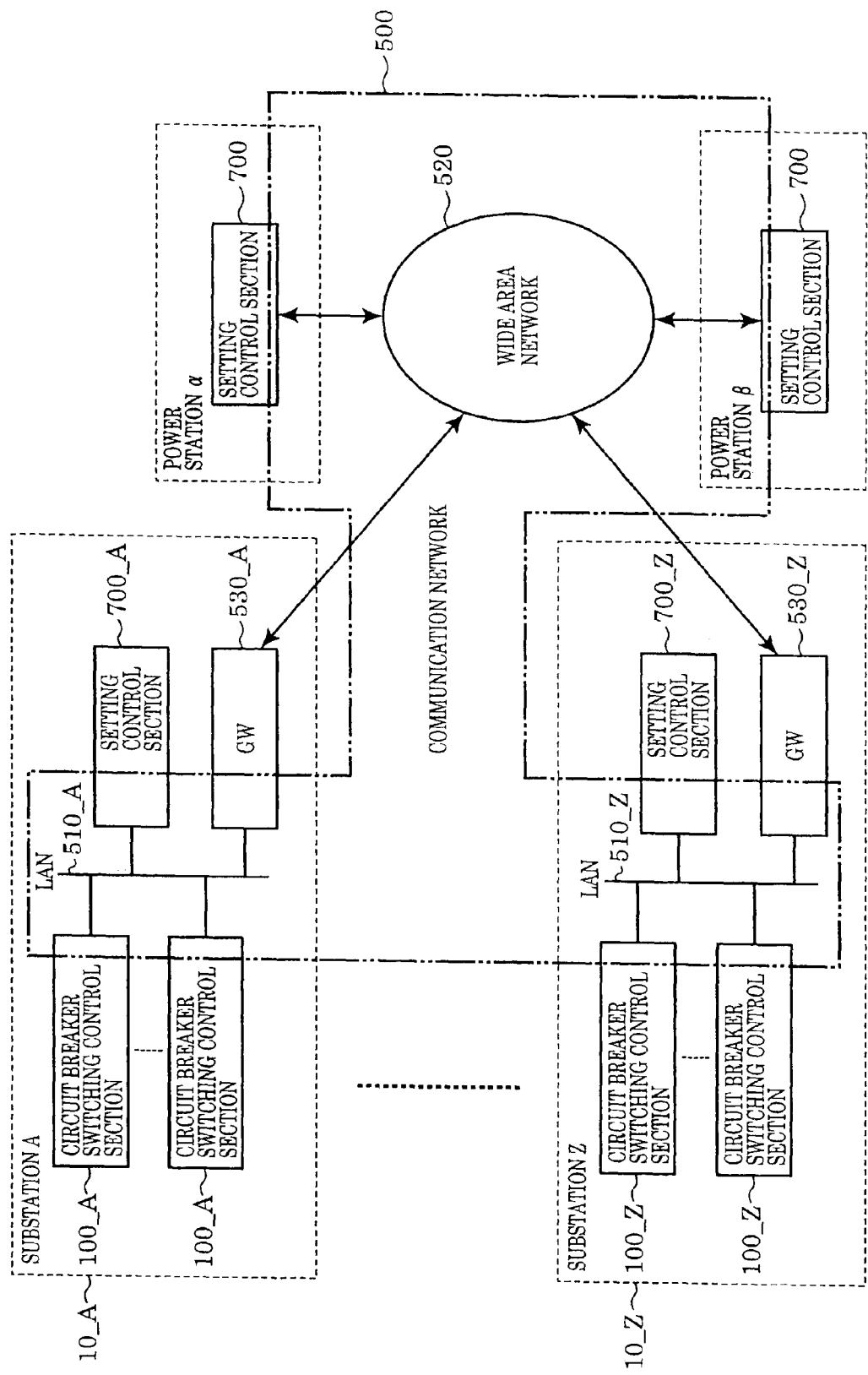
FIG. 3 is a view showing an example of the layout of a communication network of a circuit breaker switching control system according to a first embodiment of the present invention.

FIG. 3 is an example of the layout of the communication network of a circuit breaker switching control system according to the first embodiment of the present invention. The communication network 500 will be described in detail with reference to FIG. 3. In this embodiment, as the specific communication means of the communication network 500, an Ethernet LAN 510 and wide area network 520 are employed.

In each substation 10 or the like, a local-range circuit breaker switching control section 100 in this substation and a setting control section 700 are connected by the Ethernet LAN 510. For example, in FIG. 3, the switching control section 100_A_1 to 100_A_n of the substation A circuit breaker 10_A, and setting control section 700_A are connected by means of the Ethernet LAN 510_A. Likewise, the switching control section 100_Z_1 to 100_Z_n of the substation Z circuit breaker 10_Z, and setting control section 700_Z are connected by means of the Ethernet LAN 510_Z. Herein, regarding the suffixes of the symbols, for example _A_n indicates the circuit breaker n of the substation A. If there is no particular need to distinguish between these stations or circuit breakers, the symbol suffixes _A_n etc are omitted.

The Ethernet LAN 510 whereby the circuit breaker switching control section 100 and setting control section 700 of the stations 10 are connected is mutually connected with the wide area network 520 through a router or gateway 530. The setting control section 700 of for example the power station 20, corresponding to a control location at a higher level than the power station is connected with this wide area network 520. For example, in FIG. 3, the setting control section 700_α of the α power station 20_α, and the setting control section 700_β of the β power station 20_β are mutually connected by the wide area network 520. It should be noted that, although not shown, a local network such as an Ethernet LAN is present in each of the power stations 20 and is connected with the wide area network 520 through a router or gateway. Specifically, all of the circuit breaker switching control sections 100 and setting control sections 700 installed in the substation 10 and power station 20 are mutually connected through the communication network 500.

Although not shown in the Figures, for the Ethernet LAN 510, connection using a twisted pair, as such as 10 BASE-T or 100 BASE-TX, or a connection using optical fiber such as a 100 BASE-FX is employed, and the switching control section 100 and setting control section 700 are mutually connected through a hub such as for example a switching hub or repeater. Also, as the wide area network 520, there may be employed for example a network using TCP/IP protocol such as an intranet/Internet, or a circuit switching network such as a telephone circuit.

In the constructional example of the communication network of FIG. 3, a construction is adopted in which setting control sections 700 are installed at each substation 10; however, a construction could also be adopted in which these setting control sections 700 are arranged only at the power stations 20. Also, the communication network 500 may be constituted solely of for example crossed cables, or a one-to-one connection may be constituted of a single switching control section 100 and a setting control section 700. The Ethernet LAN construction, the intranet/Internet construction, and the circuit switched network such as the telephone circuit are of ordinary construction, and a detailed description thereof is therefore omitted.

<Setting Control Section 700>

The setting control section 700 will now be described in detail with reference to FIG. 1. The setting control section 700 comprises for example a communication processing section 710, display control processing section 720, setting control processing section 730, set value calculation section 740 and data saving processing section 750. A specific constructional example of the setting control section 700 may be realized by an ordinary computer such as a personal computer or workstation. The communication processing section 710 may be constituted by for example an ordinary computer Ethernet LAN interface circuit and LAN communication software.

The display control processing section 720 and setting control processing section 730 are constituted by display/setting/control/data processing software that is implemented by a CPU of an ordinary computer and a display device such as a monitor. The set value calculation section 740 is constituted by set value calculation processing software that is implemented by a CPU of an ordinary computer. The data saving processing section 750 is constituted by data saving processing software that is implemented by a CPU of an ordinary computer and an external storage device such as hard disk or CD-ROM.

The setting control section software such as the LAN communication software that is implemented on an ordinary computer, the software that performs display/setting/control/data processing, the software for set value calculation processing, and the data saving software must usually be specially developed in accordance with the computer hardware construction employed or operating system, and related software, but ordinary software may be employed for some of this software.

As described above, the setting control section 700 is implemented by installing setting control section software in an ordinary computer that satisfies the necessary operating conditions such as an Ethernet LAN interface circuit, a CPU capable of implementing the setting control section software, and an external storage device such as a hard disk. In this embodiment, unless specially noted in the following description, an ordinary computer on which setting control section software is installed is employed for the setting control section 700.

Also, although not illustrated, it is possible to install software for implementing a setting control section respectively on a plurality of ordinary computers arranged at each substation 10 or power station 20. If this is done, a plurality of setting control sections 700 are installed at each substation 10 or power station 20 and a system according to the present invention may be constituted using this plurality of setting control sections 700. In this case, this plurality of setting control sections 700 and plurality of circuit breaker switching control sections 100a to 100n may be mutually connected through the communication network 500.

The setting control section 700 may be implemented on dedicated hardware and the other portions (specifically, the communication processing section 710, display control processing section 720, setting control processing section 730, set value calculation section 740 and data saving processing section 750 etc) may be constituted by software running on dedicated hardware.

[Operation]

The operation of a system according to a first embodiment constructed as described above is described below.

<Operation of the Circuit Breaker Switching Control Section 100>

The operation of the circuit breaker switching control section 100 is described below.

In this embodiment, when the contacts of the circuit breaker 1100 are opened or closed with a prescribed phase of the main circuit current or power system voltage, synchronized switching control is performed as follows. First of all, a circuit breaker switching command signal from an upper-level device 2000 such as a protective relay device or BCU is input to the switching command control section 160 of the circuit breaker switching control section 100. After the lapse of a prescribed delay time from input of the switching command signal, the semiconductor switch of the switching command output section 162 is turned ON, with the result that a switching command signal (circuit breaker drive current) is output, subject to synchronized switching control, in respect of the circuit breaker drive coil 1110.

In this case, the decision as to whether or not the prescribed delay time has elapsed is performed by the switching command output control processing section 161 provided in the switching command control section 160 starting counting from the input time of the switching signal, when the count has reached the synchronization delay count value. Also, the prescribed delay time, i.e. the synchronization delay count value, is transmitted to the switching command output control processing section 161 of the switching command control section 160 via the I/O bus 101 after being calculated by the switching control calculation MPU 141 of the switching control calculation processing section 140. On output of the switching command signal, under synchronization control, in respect of the circuit breaker 100, the hardware counter of the switching command output control processing section 161 of the switching command control section 160 turns the semiconductor switch of the switching command output section 162 ON with a prescribed timing, by counting this synchronization delay count value.

Figure 4:
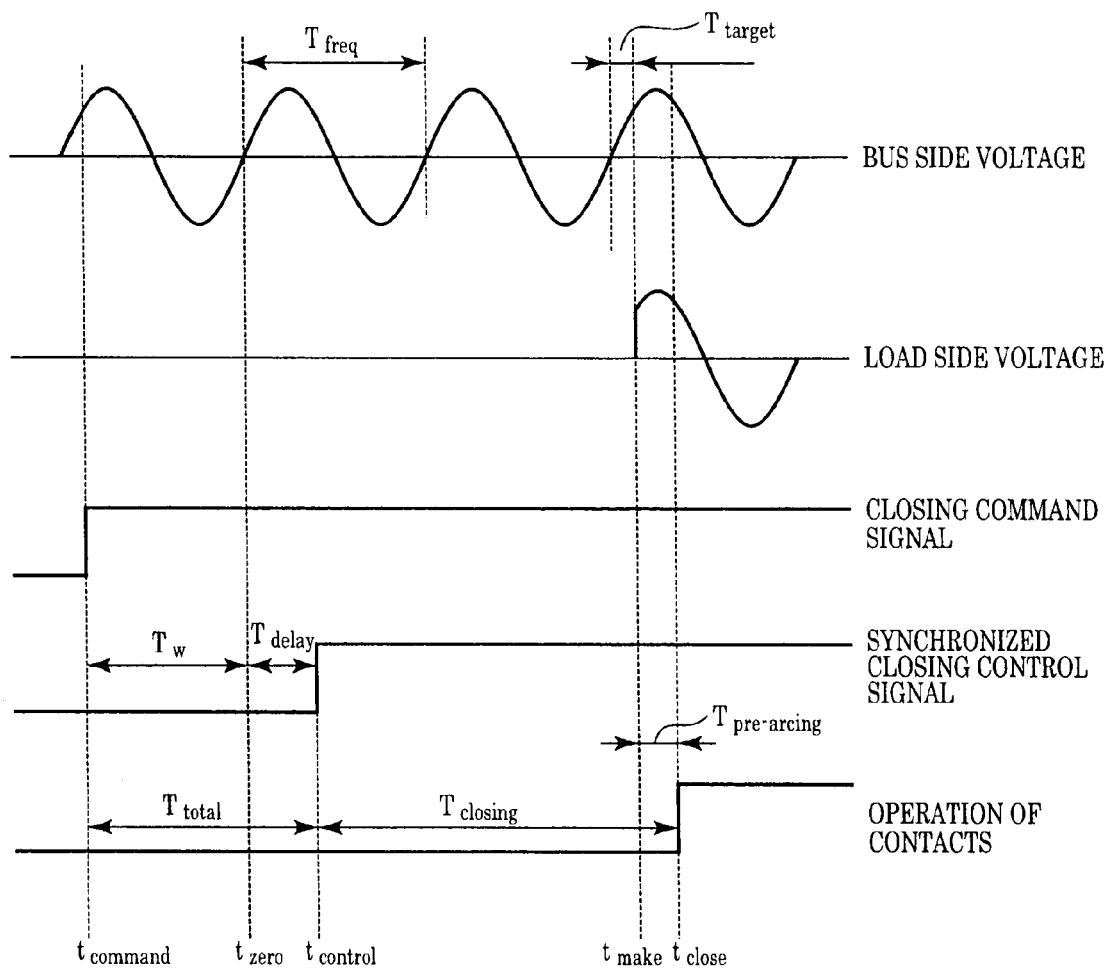
FIG. 4 is a timing chart showing an example of a closing control method of a circuit breaker switching control system according to a first embodiment of the present invention.

FIG. 4 is a timing chart example of the method of closing control of the circuit breaker switching control system of the first embodiment of the present invention. The synchronized closing control algorithm of the circuit breaker switching control section 100 will now be described in detail with reference to FIG. 4. The meaning of the various symbols used in the Figure is as follows.

$T_w$: zero-cross point waiting time $T_{delay}$: synchronized closing delay time $T_{target}$: time from the zero-cross point to the target electrical turn-on phase ($T_{target} < T_{freq}$)

$T_{closing}$: closing actuation time $T_{a\_contact}$: closing actuation time measured at auxiliary contact (a contact)

$\Delta T_{closing}$: error of closing actuation time measured at auxiliary contact (a contact)

$T_{freq}$: power system period $T_{pre-arcing}$: pre-arcing time $T_{total}$: total waiting time from input of closure command signal to output of closure command signal $t_{command}$: closure command signal input timing $t_{zero}$: timing of next zero-cross point after input of closure command signal $t_{control}$: closure command signal output timing $t_{close}$: closing timing of mechanical contacts $t_{make}$: electrical turn-on timing After detection of the closure command signal with the timing of $t_{command}$, the switching command control section 160 waits for the timing $t_{zero}$ of the next zero-cross point of the bus-side voltage. The synchronized closing delay time $T_{delay}$ is then calculated, under the assumption that the circuit breaker 1100 should close at a prescribed phase (the timing of $t_{close}$ in FIG. 4) of the power system voltage (bus-side voltage), once the closure command signal, that performs synchronized closing control of the circuit breaker 1100, is output, after the lapse of a delay time of the synchronized closing delay time $T_{delay}$ from the timing $t_{zero}$ of this zero-cross point.

The synchronized closing delay time $T_{delay}$ is calculated by the switching control calculation MPU 141 of the switching control calculation processing section 140. The synchronized closing delay time $T_{delay}$ is obtained by the following expression using the time $T_{target}$ from the zero-cross point to the target turn-on phase (this is the electrical target turn-on phase i.e. the timing of $T_{make}$ in FIG. 4), the pre-arcing time $T_{pre-arcing}$ corresponding to the target turn-on phase, the closing actuation time $T_{closing}$ of the circuit breaker, and the power system period $T_{freq}$.

$$T_{delay} = T_{freq}(T_{target}T_{pre-arcing}(T_{closing} \% T_{freq}))$$
$$(0 \leq T_{delay} < 2 \times T_{freq})$$

where ($T_{closing} \% T_{freq}$) is the remainder of $T_{closing}/T_{freq}$ and the pre-arcing time $T_{pre-arcing}$ is obtained by the following expression using the voltage peak value $V_{make}$ at the target turn-on phase and the rate of decay of dielectric strength RDDS.

$$T_{pre\text{-}arcing} = V_{make}/\text{RDDS}.$$

The circuit breaker closing actuation time $T_{closing}$ varies depending on the circuit breaker temperature, control voltage, operating pressure, and interval between actuations. The circuit breaker closing actuation time $T_{closing}$ must therefore be constantly corrected in accordance with conditions such as the circuit breaker temperature, control voltage, operating pressure and interval between actuations.

Figure 5A:
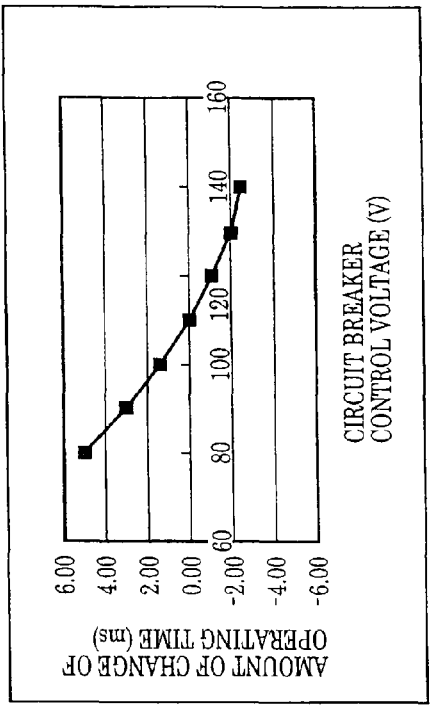
FIG. 5 is a graph showing an example of set values of the temperature characteristic, control voltage characteristic, operating pressure characteristic, and actuation interval characteristic of a circuit breaker switching control system according to a first embodiment of the present invention.
Figure 5B:
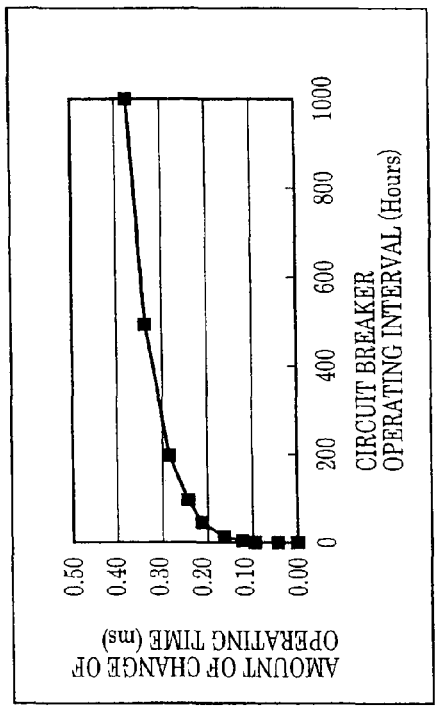
Figure 5C:
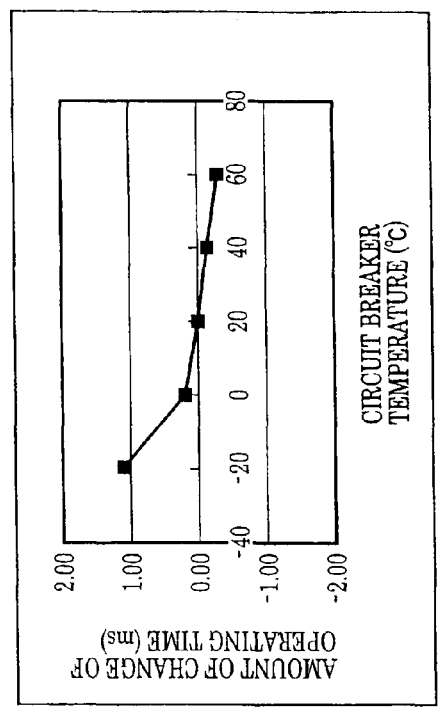

As shown in FIG. 2, the data of the circuit breaker pressure temperature, control voltage and operating pressure are constantly acquired by the signal input section 120. The switching control calculation MPU 141 of the switching control calculation section 140 can therefore perform correction calculation of the closing actuation time $T_{closing}$ based on the circuit breaker temperature, control voltage, and operating pressure. The correction calculation of the closing actuation time $T_{closing}$ based on the circuit breaker temperature, control voltage, and operating pressure can be performed by calculation based on correction data as shown by for example the circuit breaker temperature characteristic of FIG. 5(a), the circuit breaker control voltage characteristic of FIG. 5(b), or the circuit breaker operating pressure characteristic of FIG. 5(c).

Figure 5D:
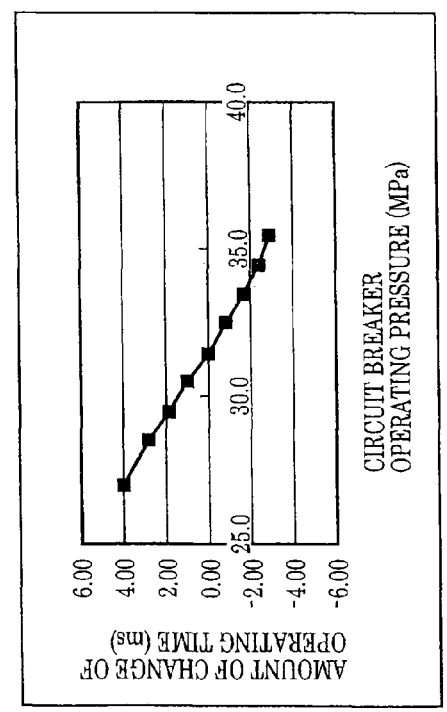
Figure 6A:
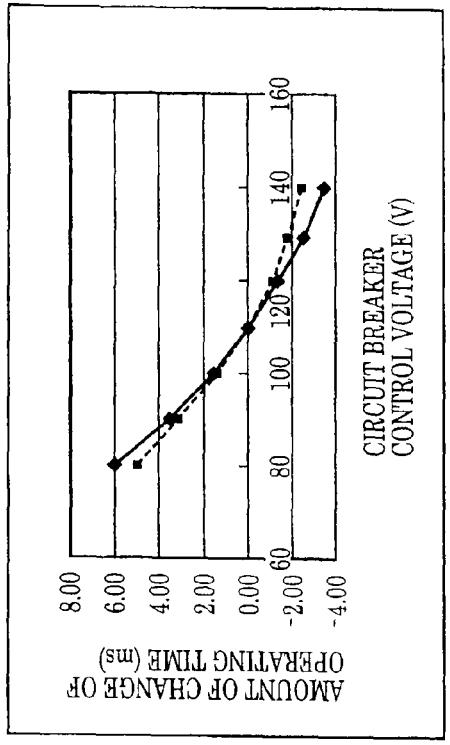
FIG. 6 is a graph showing an example of recalculated set values of the temperature characteristic, control voltage characteristic, operating pressure characteristic and actuation interval characteristic of a circuit breaker switching control system according to a first embodiment of the present invention.
Figure 6B:
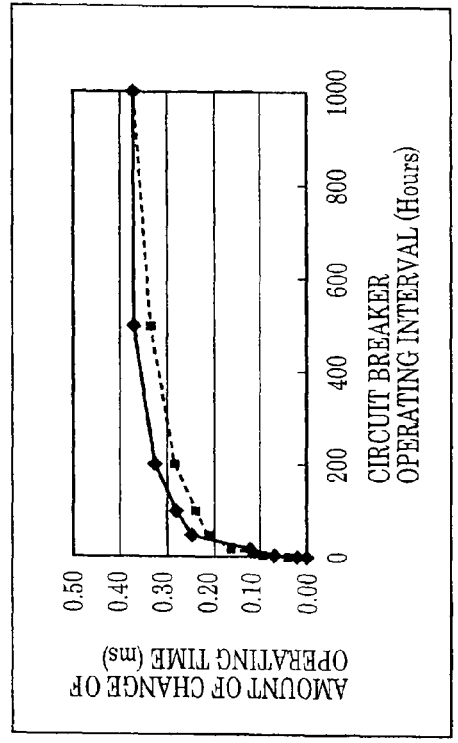
Figure 6C:
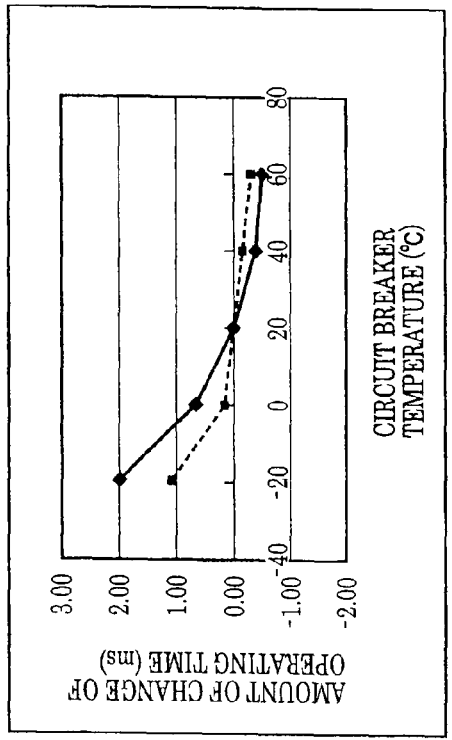
Figure 6D:
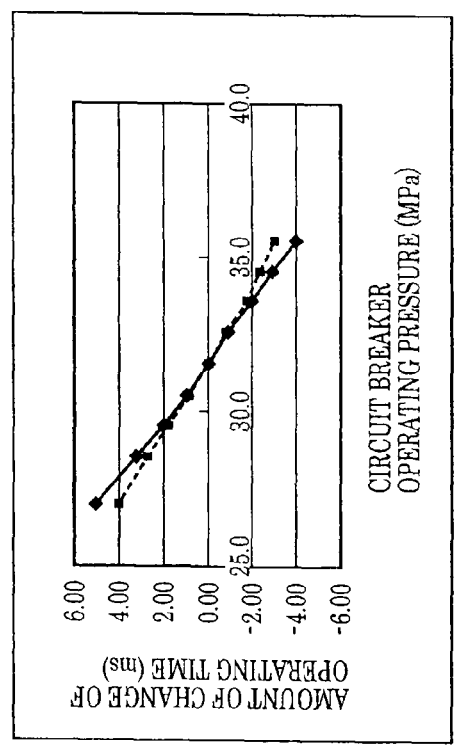

Also, as shown in FIG. 2, a real-time clock 145 is mounted on the switching control calculation processing section 140, so that the date and time of actuation of the circuit breaker on the previous occasion can be acquired. Consequently, the interval between circuit breaker actuations can be calculated by the switching control calculation MPU 141, so correction calculation of the closing actuation time $T_{closing}$ based on the actuation interval can be performed. The correction calculation of the closing actuation time $T_{closing}$ based on the actuation interval of the circuit breaker can be performed using for example correction data as indicated in the circuit breaker actuation interval characteristic of FIG. 5(d).

It may be noted that the same operation may be performed in respect of synchronized opening control. However, synchronized opening control is generally performed with reference to the zero-cross point of the main circuit current: it is known that it is not necessary to take the pre-arcing time into consideration. Also, the synchronized switching control algorithm indicated in this embodiment is merely one example: any other synchronized switching control algorithm may be employed in the present invention.

A specific example of data acquisition and saving actuation by the circuit breaker switching control section 100 in this embodiment is described below. When the circuit breaker switching control section 100 executes synchronized switching control of the circuit breaker 1100, data associated with synchronized switching control at this time-point are saved. Specifically, for example the following data are saved.

the circuit breaker actuation date and time
    the main circuit current waveform before and after circuit breaker switching actuation
    the power system voltage waveform before and after circuit breaker switching actuation
    the circuit breaker stroke waveform
    the circuit breaker opening actuation time and closing actuation time
    the circuit breaker temperature
    the circuit breaker control voltage
    the circuit breaker operating pressure
    other data.

A specific embodiment of actuation of the data acquisition/saving process is described below.

(1) Synchronized switching control-related data such as the main circuit current, the power system voltage, the stroke of the circuit breaker, the temperature, the control voltage and the operating pressure acquired by the signal input section 120 are transmitted to the switching control calculation processing section 140 via the I/O bus 101.

(2) The switching control calculation MPU 141 of the switching control calculation processing section 140 converts the synchronized switching control-related data such as the main circuit current, power system voltage, circuit breaker stroke, temperature, control voltage and operating pressure into physical quantities and performs calculation of for example the circuit breaker opening actuation time and closing actuation time and writes the results in the DPRAM 144.

(3) The communication calculation MPU 181 of the communication calculation processing section 180 acquires the synchronized switching control-related data that was written to the DPRAM 144.

(4) The communication calculation MPU 181 of the communication calculation processing section 180 saves the acquired synchronized switching control-related data in the Flash ROM 183.

(5) When a request for acquisition of synchronized switching control-related data is generated in respect of the circuit breaker switching control section 100 from the setting control section 700, the communication calculation MPU 181 of the communication calculation processing section 180 transmits the synchronized switching control-related data that was saved in the Flash ROM 183 to the setting control section 700 via the communication network 500.

Next, a specific example of the operation of setting the circuit breaker switching control section 100 in this embodiment will be described. The circuit breaker switching control section 100 must perform setting of the necessary set values for synchronized switching control of the circuit breaker 1100. Specifically, for example the following set values are set in the circuit breaker switching control section 100. It should be noted that, in the detailed description and claims of the present invention, "set values" means all the values that are written to the switching control section 100 or other sections and in general includes for example the operating reference values, called "setting values (or stabilization values)" and adjustment values of the characteristics.

the target opening phase and target closing phase
    the circuit breaker opening actuation time and closing actuation time
    the circuit breaker rate of decay of dielectric strength (RDDS)
    the temperature characteristic of the circuit breaker opening actuation time and closing actuation time
    the control voltage characteristic of the circuit breaker opening actuation time and closing actuation time
    the operating pressure characteristic of the circuit breaker opening actuation time and closing actuation time
    the actuation interval characteristic of the circuit breaker opening actuation time and closing actuation time
    other data Specific embodiments of the operation of setting the set values are as follows.

(1) The communication calculation MPU 181 of the communication calculation processing section 180 saves the set values that are transmitted from the setting control section 700 via the communication network 500 in the Flash ROM 183.

(2) The switching control calculation MPU 141 of the switching control calculation processing section 140 acquires the set values from the communication calculation processing section 180 through the DPRAM 144.

(3) The switching control calculation MPU 141 of the switching control calculation processing section 140 performs synchronized switching control calculation using the set values that have thus been acquired.

<Operation of the Setting Control Section 700>

The operation of the setting control section 700 is described below. The setting control section 700 has the following main functions.

- function of saving the synchronized switching control-related data acquired by the circuit breaker switching control section 100
- function of displaying the synchronized switching control-related data acquired by the circuit breaker switching control section 100
- function of calculating the set values of the circuit breaker switching control section 100
- function of displaying/transmitting the set values of the circuit breaker switching control section 100

The function of saving/displaying synchronized switching control-related data acquired by the circuit breaker switching control section 100 is described below.

(1) Synchronized switching control-related data transmitted via the communication network 500 from the circuit breaker switching control section 100 are received by the communication processing section 710 of the setting control section 700.

(2) The switching control-related data that are received are saved in a data saving processing section 750 constituted by an external storage device such as a hard disk and the synchronized switching control-related data are displayed on a display device such as a monitor by a display/control processing section 720 constituted by display/setting/control/data processing software constituting an HMI (Human Interface).

The calculation function and display/transmission function of the set values of the circuit breaker switching control section 100 are described below.

(1) The set value calculation section 740 of the setting control section 700 reads the synchronized switching control-related data that are saved in the data saving processing section 750.

(2) The set value calculation processing software of the set value calculation section 740 calculates the set values of the circuit breaker switching control section 100.

(3) The display/control/processing section 720 displays on a display device such as a monitor the set values of the circuit breaker switching control section 100 calculated by the set value calculation section 740, using display/setting/control/data processing software constituting an HMI (Human Interface).

(4) The setting/control/processing section 730 issues a transmission command to the circuit breaker switching control section 100 to transmit the necessary set values, of the set values of the circuit breaker switching control section 100 calculated by the set value calculation section 740.

(5) The set values in respect of which a transmission command was issued by the setting/control/processing section 730 are subjected to transmission processing by the communication processing section 710 and transmitted to the circuit breaker switching control section 100 via the communication network 500.

Next, the details of the actuation process in regard to the set value calculation section 740 are described below.

The set value calculation section 740 performs calculation of the set values for purposes of synchronized switching control of the circuit breaker 1100. Either completely new set values can be calculated or new set values can be obtained by recalculation by correcting the previously employed set values. Specifically, the set values may be calculated for example as follows.

- the circuit breaker opening actuation time and closing actuation time (or the opening actuation time and closing actuation time of the circuit breaker)
- the circuit breaker rate of decay of dielectric strength (RDDS)
- the temperature characteristic of the circuit breaker opening actuation time and closing actuation time
- the control voltage characteristic of the circuit breaker opening actuation time and closing actuation time
- the operating pressure characteristic of the circuit breaker opening actuation time and closing actuation time
- the actuation interval characteristic of the circuit breaker opening actuation time and closing actuation time
- other data Typically, values obtained by statistical processing (for example average value processing) of the measured values of opening actuation time and closing actuation time obtained by actuating the circuit breaker a plurality of times in a factory test or installation test performed on-site are employed as the set values for the circuit breaker opening actuation time and closing actuation time. In this embodiment, in order to improve the accuracy of the preset opening actuation time and closing actuation time that are acquired in this way after commencement of operation, data that reflect the data on circuit breaker actuation after commencement of operation of the substation are employed.

The set values of the opening actuation time and closing actuation time are newly recalculated, using, as the elements of statistical processing (such as for example average value processing), the measured values of opening actuation time and closing actuation time acquired every time synchronized switching control of the circuit breaker 1100 is executed. These are set in the circuit breaker switching control section 100 as the new set values of the recalculated opening actuation time and closing actuation time.

The temperature characteristic of the circuit breaker opening actuation time and closing actuation time, the control voltage characteristic, operating pressure characteristic and actuation interval characteristic are typically characteristics that depend on the model of the circuit breaker, and are for example characteristic data as shown in FIG. 5, expressed as the amount of variation of the opening actuation time or closing actuation time with respect to the rated conditions. Circuit breakers of the same model have the same characteristics, so in general, the data acquired in for example a model test performed in the factory are employed. In this embodiment, in order to improve the data accuracy of the preset temperature characteristic, control voltage characteristic, operating pressure characteristic and actuation interval characteristic that are acquired in this way after commencement of operation, data that reflect the data on circuit breaker actuation after commencement of operation of the substation are employed.

The variation of the opening actuation time and closing actuation time with respect to the rated conditions are calculated using the measured values of the opening actuation time and closing actuation time acquired every time synchronized switching control of the circuit breaker 1100 is executed, and the measured values of the circuit breaker temperature, control voltage, operating pressure and actuation interval at that time. The set values of the temperature characteristic, control voltage characteristic, operating pressure characteristic and actuation interval characteristic are newly recalculated, using, as the elements of statistical processing (such as for example average value processing), the measured values of the variation of opening actuation time and closing actuation time acquired in this way. These are set in the circuit breaker switching control section 100 as the new set values of the recalculated temperature characteristic, control voltage characteristic, operating pressure characteristic and actuation interval characteristic.

It should be noted that circuit breakers of the same model have the same characteristics in respect of the temperature characteristic of the circuit breaker opening actuation time and closing actuation time, the control voltage characteristic, operating pressure characteristic and actuation interval characteristic. Consequently, the accuracy of the set values of the recalculated temperature characteristic, control voltage characteristic, operating pressure characteristic and actuation interval characteristic can be further improved by employing data obtained from a circuit breaker switching control section 100 that is employed in a plurality of circuit breakers of the same model connected with a communication network 500 in recalculation (for example average value processing).

FIG. 6 shows examples of the set values of the recalculated temperature characteristic, control voltage characteristic, operating pressure characteristic and actuation interval characteristic. The dotted lines in FIG. 6 represent the characteristic data that are conventionally set in the circuit breaker switching control section 100. The continuous lines in FIG. 6 show the set values of the recalculated temperature characteristic, control voltage characteristic, operating pressure characteristic and actuation interval characteristic. The set values in accordance with the continuous line are newly set in the circuit breaker switching control section 100. The rate of decay of dielectric strength (RDDS) of the circuit breaker may also be recalculated by the set value calculation section 740 and reset in the circuit breaker switching control section 100.

It should be noted that the recalculation and resetting of the set values of the circuit breaker switching control section 100 described above merely represent one example and identical processing could be performed in regard to all the other set values of the circuit breaker switching control section 100.

[Beneficial Effect]

As will be clear from the above description, the circuit breaker switching control system according to the present embodiment has the following beneficial effects.

(1) A circuit breaker switching control system can be provided wherein if the data such as the temperature characteristic, control voltage characteristic, hydraulic pressure characteristic, actuation interval characteristic and rate of decay of dielectric strength (RDDS) of the circuit breaker are not available beforehand, these can easily be set as set values in the circuit breaker synchronized switching control device, using separate measurements of these data.

(2) A circuit breaker switching control system can be provided wherein the data such as the temperature characteristic, control voltage characteristic, hydraulic pressure characteristic, actuation interval characteristic and rate of decay of dielectric strength (RDDS) of the circuit breaker can easily be revised, based on data acquired after commencement of operation.

(3) A circuit breaker switching control system can be provided wherein these data can easily be revised, in response to changes in the circuit breaker over the years.

(4) Since the switching control section and the setting control section of the circuit breaker are connected by a communication network, operations as described above can easily be remotely implemented without needing to visit the site.

The beneficial effect of the circuit breaker switching control system according to the present embodiment is described below in further detail.

(1) Previously, it was difficult for a third party other than the manufacturer of the circuit breaker main unit to acquire data such as the circuit breaker temperature characteristic, control voltage characteristic, operating pressure characteristic, actuation interval characteristic or rate of decay of dielectric strength (RDDS) when the manufacturer of the circuit breaker main unit and the manufacturer of the circuit breaker synchronized switching control device were different, so it was difficult to set these data as set values in the synchronized switching control device of the circuit breaker beforehand prior to shipping. Consequently, when the manufacturer of the circuit breaker main unit and the manufacturer of the circuit breaker synchronized switching control device were different, it was difficult to achieve the expected synchronized switching control accuracy.

However, when the circuit breaker switching control system of this embodiment is employed, correction of these set values can be achieved which reflects data obtained on circuit breaker actuation after commencement of operation of the substation, so accurate synchronized switching control can be achieved even when the manufacturer of the circuit breaker main unit and the manufacturer of the circuit breaker synchronized switching control device are different. The inconvenience of prior imposition of restrictions regarding the purchasing source of the circuit breaker main unit or circuit breaker synchronized switching control device, or both of these, in the case of power systems where synchronized switching control is required is therefore eliminated. Consequently, the degree of freedom of users such as power companies regarding selection of the purchasing source of circuit breaker main units is increased.

(2) Even when the manufacturer of the circuit breaker main unit and the manufacturer of the circuit breaker synchronized switching control device were the same, in the case where a synchronized switching control device was added to an old, previously installed, circuit breaker, it was not necessarily the case that all the data such as the temperature characteristic, control voltage characteristic, operating pressure characteristic, actuation interval characteristic and rate of decay of dielectric strength (RDDS) were available; consequently, it was difficult to achieve the expected level of accuracy of synchronized switching control. When the circuit breaker switching control system according to this embodiment is applied, accurate synchronized switching control can be achieved even with old, previously installed circuit breakers. Consequently, when a circuit breaker switching control system according to the present embodiment is employed, restrictions on the circuit breakers to which the circuit breaker synchronized switching control device can be applied are eliminated and application to already-installed circuit breakers becomes easy; not only this, but, in addition, when replacing circuit breakers, it becomes unnecessary to replace the synchronized switching control device also: freedom of practical deployment is thereby increased.

(3) Even with the same model of circuit breaker, there are individual differences between circuit breakers in regard to their opening actuation time and closing actuation time under standard conditions, due to factors such as manufacturing variation. Although, in order to increase the accuracy of the set values of opening actuation time and closing actuation time as many measurement value data as possible are required, due to reasons such as restrictions on the mechanical life and testing time of the circuit breaker, at most about a few tens of sets of data can be measured in respect of the same circuit breaker, in factory tests and on-site tests. In addition, there is a possibility that the circuit breaker opening actuation time and closing actuation time may vary over the years due to the effect of for example the number of times of actuation of the circuit breaker. By applying the circuit breaker switching control system according to this embodiment, the set values of the opening actuation time and closing actuation time can be constantly recalculated, using a large number of most recent measured values of the opening actuation time and closing actuation time. Consequently, synchronized switching control of higher accuracy can be achieved.

Second Embodiment

[Construction]

Figure 7:
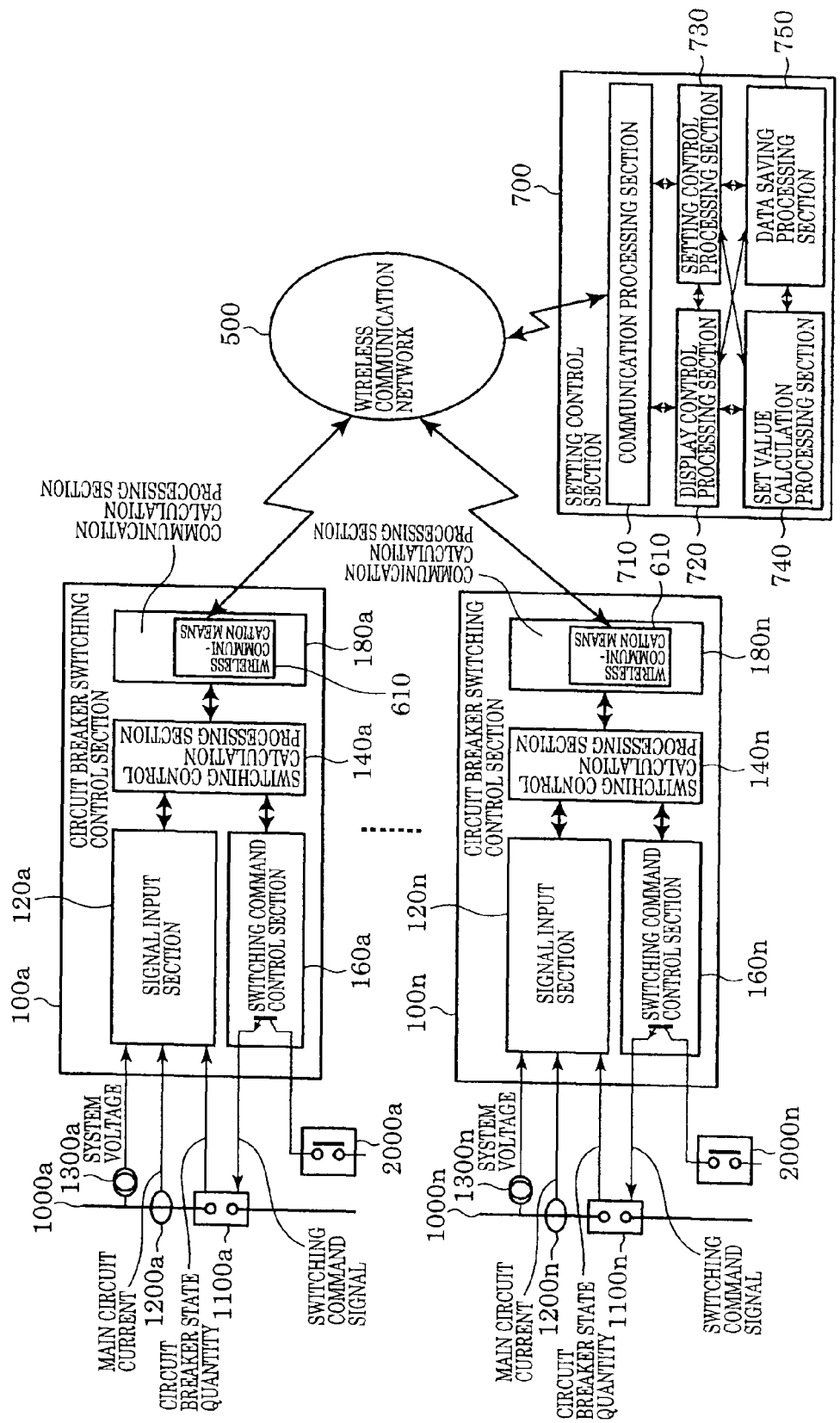
FIG. 7 is a system layout diagram of a circuit breaker switching control system according to a second embodiment of the present invention.

FIG. 7 is a system layout diagram of a circuit breaker switching control system according to a second embodiment of the present invention. 100a to 100n in FIG. 7 are circuit breaker switching control sections; 600 is a wireless communication network; and 700 is a setting control section: these are the main constituent parts of a circuit breaker switching control system according to the second embodiment.

Wireless communication means 610a to 610n are incorporated in communication calculation processing sections 180 of the circuit breaker switching control sections 100a to 100n in FIG. 7. The wireless communication means 610 may replace all or part of the communication interface 184 of the first embodiment shown in FIG. 2. Alternatively, the wireless communication means 610 and a wired communication interface 184 may be employed together. Otherwise, the detailed construction of the circuit breaker switching control section 100 is the same as that of the first embodiment, so further description thereof may be dispensed with.

A wireless communication processing section 620 is incorporated in the setting control section 700 of FIG. 7. The wireless communication processing section 620 is constituted by example an ordinary computer wireless LAN interface circuit and wireless LAN communications software. The wireless communication processing section that 620 may replace all or part of the communication processing section 710 of the first embodiment shown in FIG. 1. The wireless communication processing section 620 and a wired communication processing section 720 may be employed together i.e. an ordinary computer wireless LAN interface circuit and wired Ethernet LAN interface may be employed together. Otherwise, the detailed construction of the setting control section 700 is the same as that of the first embodiment, so further description thereof may be dispensed with.

An example construction of the wireless communication network 600 of FIG. 7 is a wireless communication network that connects the setting control section 700 and circuit breaker switching control sections 100a to 100n in the local range of for example a substation by means of a wireless LAN. In the system layout of FIG. 7, a communication network is constituted solely by a wireless communication network 600, but it would also be possible to combine a wired communication network 500 and wireless communication network 600 using for example a media converter or hub.

It would also be possible to mutually connect the setting control section 700 and some of the circuit breaker switching control sections 100a to 100n using a wired Ethernet LAN and to connect some of these using a wireless LAN. The wireless communication network 600 may be connected with a broadband network using for example a repeater or switching hub capable of connection with a wireless LAN. A layout could also be adopted in which a single circuit breaker switching control section 100 and setting control section 700 are connected wirelessly in one-to-one fashion using a wireless communication network 600.

Although, in FIG. 7, a layout was employed in which the wireless communication means 610 was incorporated in the communication calculation processing section 180, a system layout could be adopted in which the wireless communication means 610 is provided outside the circuit breaker switching control section 100. In this case, a circuit breaker switching control section 100 is employed which is identical with that of the first embodiment, and the communication interface 184 of the circuit breaker switching control section 100 and wireless communication means 610 provided outside this may be connected using for example a wired Ethernet LAN.

Likewise, although, in FIG. 7, a layout was adopted in which the wireless communication processing section 620 was incorporated in the setting control section 700, a system layout could also be adopted in which the wireless communication processing section 620 is provided outside the setting control section 700. In this case, the ordinary computer constituting the setting control section 700 may be identical with that employed in the first embodiment, and the wireless LAN device and ordinary computer may be connected using for example a wired Ethernet LAN and USB interface.

[Operation and Beneficial Effect]

The operation and beneficial effect of the second embodiment constructed as described above are the same as in the case of the first embodiment except that the communication network is a wireless network. In addition, since, in the second embodiment, the circuit breaker switching control section 100 and setting control section 700 are wirelessly connected, the labor involved in laying wired cables can be dispensed with. In particular, if the circuit breaker switching control system is mounted on an already-installed switching device, although application in locations where laying of cables is difficult might be thought to be problematical, in such cases, by application of the present embodiment, laying of cables becomes unnecessary, so the work is facilitated and becomes economic.

Also, if a one-to-one connection is made between a single circuit breaker switching control section 100 and setting control section 700, a cable is unnecessary, so these two can easily be connected and convenience so far as the operator is concerned is thereby improved. This is an effective means of improving the efficiency of performance of the task in particular when for example data collection and/or an actuation check are to be performed and the set values are to be updated using the latest synchronized switching control-related data of the circuit breaker, with a one-to-one on-site connection of the individual circuit breaker switching control sections 100 and setting control sections 700, during periodic inspection etc.

Third Embodiment

[Construction]

Figure 8:
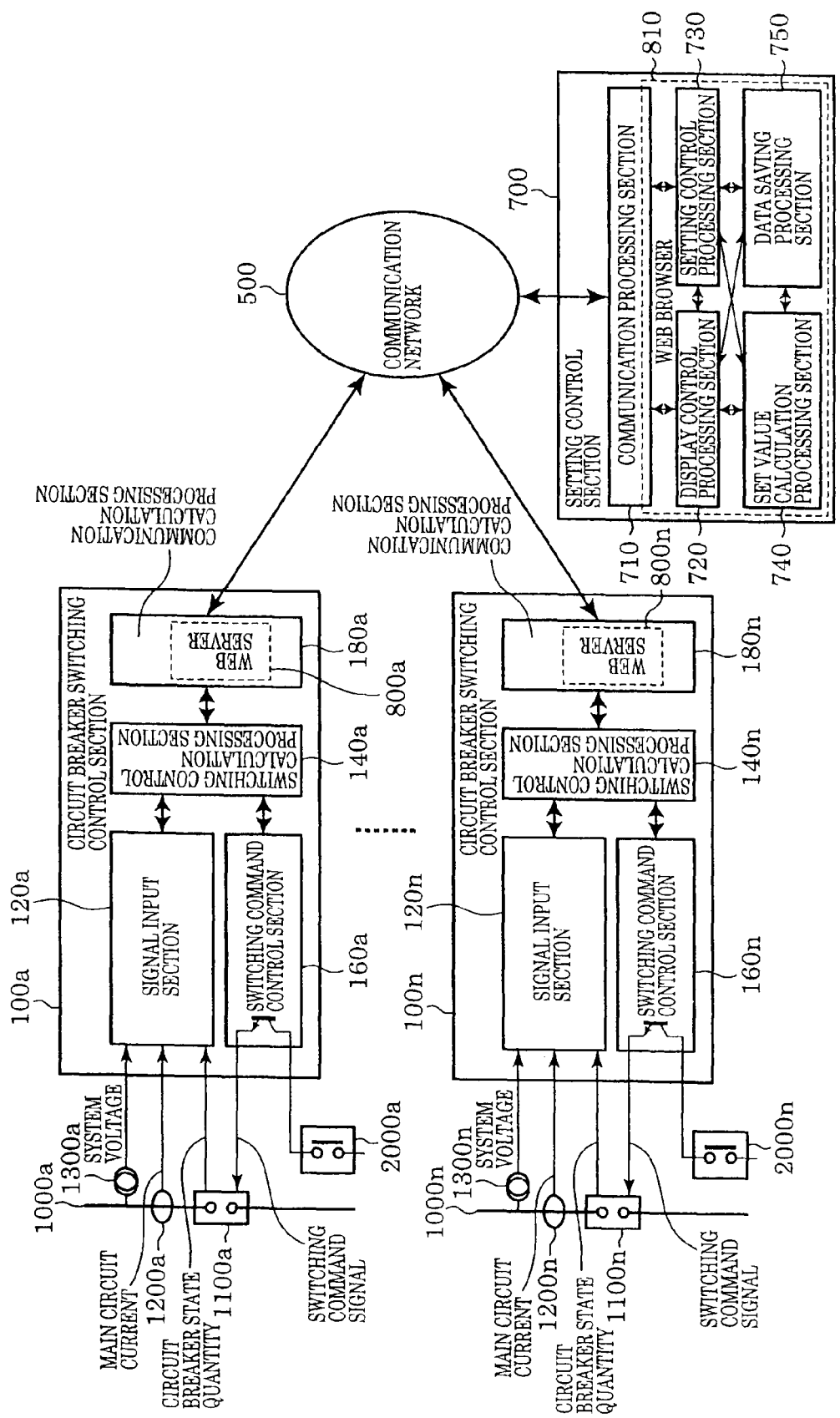
FIG. 8 is a system layout diagram of a circuit breaker switching control system according to a third embodiment of the present invention.

FIG. 8 is a system layout diagram of a circuit breaker switching control system according to a third embodiment of the present invention. In FIG. 8, 100a to 100n are circuit breaker switching control sections, 500 is a communication network and 700 is a setting control section. The construction of these items is the same as in the case of the circuit breaker switching control system of the first embodiment, so a detailed description thereof may be dispensed with.

The points of difference between the circuit breaker switching control system of the first embodiment and the circuit breaker switching control system of the third embodiment are as follows.

(1) Web Server 800 Installed in the Communication Calculation Processing Section of the Circuit Breaker Switching Control Section The web server 800 is constituted by software having an information transmission function using the www (World Wide Web), running on the communication calculation MPU 181 (see FIG. 2) of the communication calculation processing section 180 of the circuit breaker switching control section 100.

(2) Web Browser 810 Installed in the Setting Control Section

The web browser 810 is software for example display/setting/control/data processing/data display running on the CPU of the setting control section 700 constituted by an ordinary computer: this software requests and displays information transmitted by the web server 800. Commercially available web browser software, such as Internet Explorer, may be employed.

(3) Communication Network 500

For the communication network 500 of the third embodiment, the Internet or an intranet (TCP/IP protocol) can be employed. Also, when exchanging synchronized switching control-related data or set values/setting values between the circuit breaker switching control section 100 and setting control section 700 as files, the FTP or HTTP protocol may be employed. It should be noted that, just as in the case of the second embodiment, as communication means between the circuit breaker switching control section 100 and setting control section 700, a system construction employing a wireless communication network 600 may be employed.

[Operation]

With the circuit breaker switching control system of the third embodiment, the same actions as in the case of the first embodiment and second embodiment can be obtained, and, in addition, the following actions are obtained.

The communication calculation MPU 181 provided in the communication calculation processing section 180 of the circuit breaker switching control section 100 runs web server software 800. The web server 800 accumulates for example the following synchronized switching control-related data in the form of an HTML document or XML document.

the circuit breaker actuation date and time
the main circuit current waveform before and after circuit breaker switching actuation
the power system voltage waveform before and after circuit breaker switching actuation
the stroke waveform of the circuit breaker
the circuit breaker opening actuation time and closing actuation time
the circuit breaker temperature
the circuit breaker control voltage
the circuit breaker operating pressure
other data In response to a request from the web browser 810 running on the setting control section 700, the web server 800 transmits these synchronized switching control-related data to the setting control section 700 through a communication network 500 such as the Internet or intranet. The setting control section 700 can execute recalculation processing and resetting processing of the set values of the circuit breaker switching control section 100 utilizing for example JavaScript, using the web browser 810 as an HMI (Human Machine Interface). The recalculated set values that are input to the web browser 810, or recalculated set values that were saved in the form of for example a file can be transmitted to the web server 800 of the communication calculation processing section 180 through a communication network 500 such as the Internet or an intranet.

The communication calculation processing section 180 saves the recalculated set values transmitted to the web server 800 in a Flash ROM 183 (see FIG. 2). The synchronized switching control-related data or current set values can be displayed for example in the form of a table on the web browser 810. Also, the waveform data can be displayed as a graph using for example JavaScript. In other words, the operator can peruse the synchronized switching control-related data or current set values etc, or set recalculated set values in the circuit breaker switching control section 100, using the web browser 810 as an HMI. Also, the operator can save received synchronized switching control-related data or current set values in a data saving processing section 750 constituted by an external storage device such as a hard disk, using the web browser 810 as an HMI.

Also, in order to guarantee security on the network, use restrictions can be provided by setting a password on the web server 800. It should be noted that the functions of the web server 800 and web browser 810 illustrated in this embodiment are merely examples, and the other typical web server and web browser functions can also be applied in the circuit breaker switching control system according to the present invention.

[Beneficial Effect]

With the circuit breaker switching control system according to the third embodiment, the same beneficial effects as in the case of the first embodiment and second embodiment are obtained, and, in addition, the following beneficial effects are obtained. In the third embodiment, as operator HMI software, commercially available web browser software such as for example Internet Explorer may be employed. Since the operator does not need to install special-purpose communication software or maintenance software in the setting control section 700 (computer or the like for HMI use), it is not necessary for the manufacturer to supply the user with special-purpose communication software and maintenance software in the form of a CD-ROM or the like.

Since, so long as a personal computer is available on which the currently commonly used Microsoft Windows OS or Apple Mac OS and Internet Explorer are installed, it is possible to easily connect to the circuit breaker switching control system, the task of updating to recalculated set values can easily be implemented, convenience from the point of view of the operator is enormously improved.

Fourth Embodiment

[Construction]

Although not illustrated, the characteristic feature of the construction of the fourth embodiment is the installation of processing software for calculating the rate of decay of dielectric strength (RDDS) of the circuit breaker, as a sub-function of the set value calculation section 740 of the setting control section 700. Other aspects of the detailed construction are the same as in the case of the first embodiment, second embodiment and third embodiment of the present invention, so a detailed description thereof may be dispensed with.

[Operation]

Figure 9:
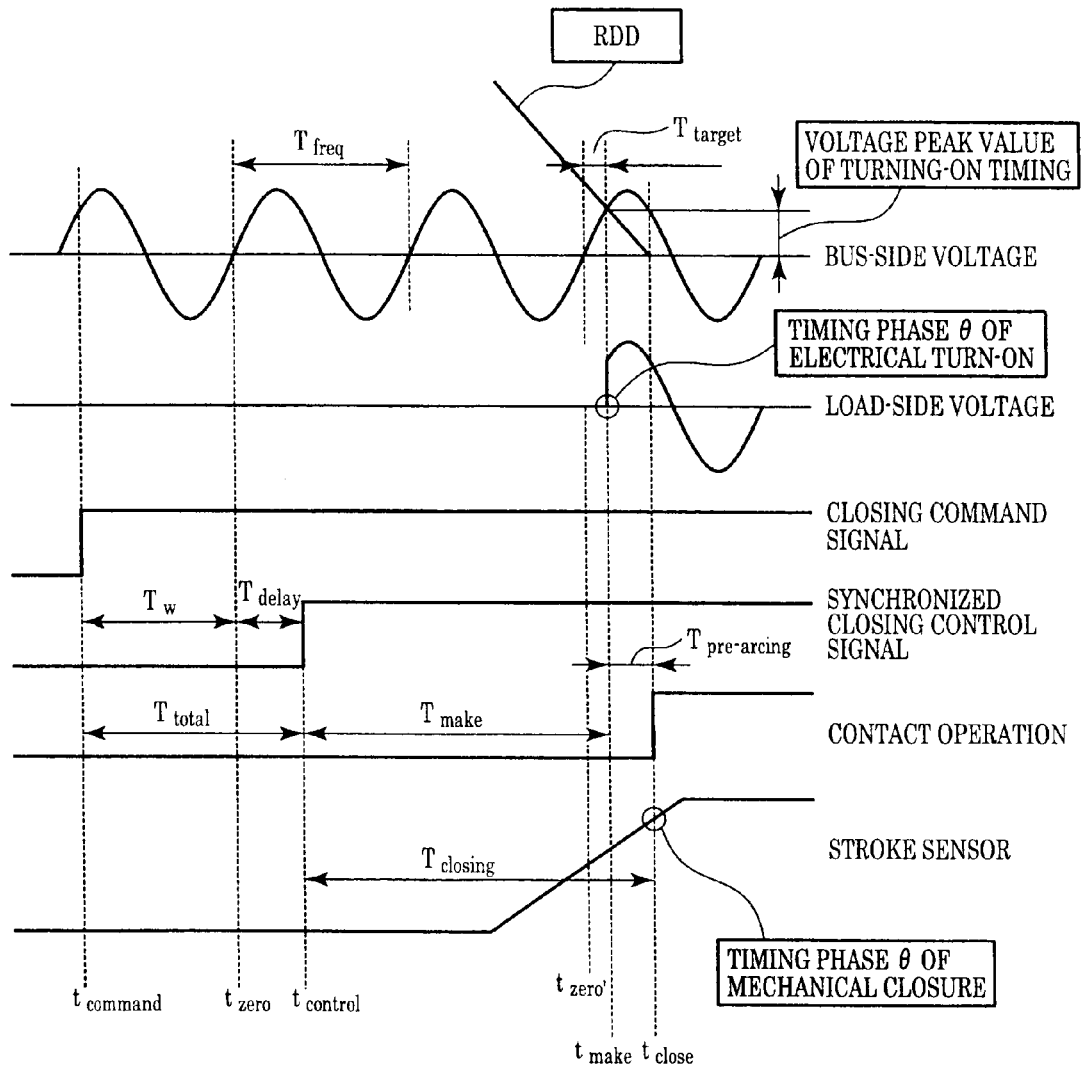
FIG. 9 is a diagram of a method of calculation of the rate of decay of dielectric strength in a circuit breaker switching control system according to a fourth embodiment of the present invention.

FIG. 9 is a diagram given in explanation of a method of calculating the rate of decay of dielectric strength (RDDS) in a circuit breaker switching control system according to the fourth embodiment of the present invention, showing a timing chart of the circuit breaker closing actuation, the main circuit current rise timing, and the signal from the stroke sensor.

In this embodiment, as shown in FIG. 9, the circuit breaker rate of decay of dielectric strength (RDDS) is calculated as the gradient (or grade) linking the power system voltage peak value Vm of the timing with which the circuit breaker is electrically turned on, and the difference between the power system voltage phase θm of the timing with which the circuit breaker is electrically turned on and the power system voltage phase θc of the timing with which the circuit breaker is mechanically closed. This may be expressed by the following expression.

$$RDDS = Vm/(\theta c - \theta m)$$

As is clear from this expression, in order to calculate the circuit breaker rate of decay of dielectric strength (RDDS), it is necessary to accurately detect the timing of electrical turning on of the circuit breaker and the timing of mechanical closing of the circuit breaker. In this embodiment, these timings are detected by the following operations.

<Timing with which the Circuit Breaker is Electrically Turned on>

The timing with which the circuit breaker is electrically turned on is calculated as the timing with which the main circuit current starts to flow. As methods of detecting the timing with which the main circuit current starts to flow, there may be employed for example the method of detecting the timing with which the main circuit current exceeds a preset threshold value, or there may be employed the timing with which a harmonic component extracted using a high-pass filter or band-pass filter is detected, or some other method. θm can be calculated by converting the timing with which the circuit breaker is electrically turned on, which is thus measured, into the power system voltage phase. Also, the power system voltage peak value Vm at this timing can be simultaneously calculated.

<Timing with which the Circuit Breaker is Mechanically Closed>

The timing with which the circuit breaker is mechanically closed is measured using the output signal of a stroke sensor. The timing with which the circuit breaker is mechanically closed means the timing with which the contacts of the circuit breaker become ON. As shown in FIG. 9, the timing with which the contacts of the circuit breaker become ON corresponds in a one-to-one fashion with the output signal of the stroke sensor. Consequently, the timing with which the circuit breaker is mechanically closed can be measured using the output signal of the stroke sensor by measuring beforehand the output value of the stroke sensor at the timing with which the circuit breaker contacts become ON, in for example a factory test.

θc can be calculated by converting the timing with which the circuit breaker is mechanically closed, measured in this way, to the power system voltage phase. It should be noted that this timing with which the circuit breaker is mechanically closed could also of course be measured based on the actuation of the auxiliary contact of the circuit breaker, or some other method could be employed.

[Beneficial Effect]

With a circuit breaker switching control system according to this embodiment, the same beneficial effects are obtained as in the case of the circuit breakers of the first to third embodiment; in addition, the following beneficial effects are also obtained. The circuit breaker rate of decay of dielectric strength (RDDS) is usually not disclosed and is the data item that is most difficult to obtain by a third party other than the manufacturer of the circuit breaker main unit. Also, even manufacturers of circuit breaker main units frequently do not always measure the rate of decay of dielectric strength (RDDS). With this embodiment, measurement of the rate of decay of dielectric strength (RDDS) can easily be carried out: this can therefore contribute to improving the accuracy of synchronized switching control.

Fifth Embodiment

[Construction]

Figure 10:
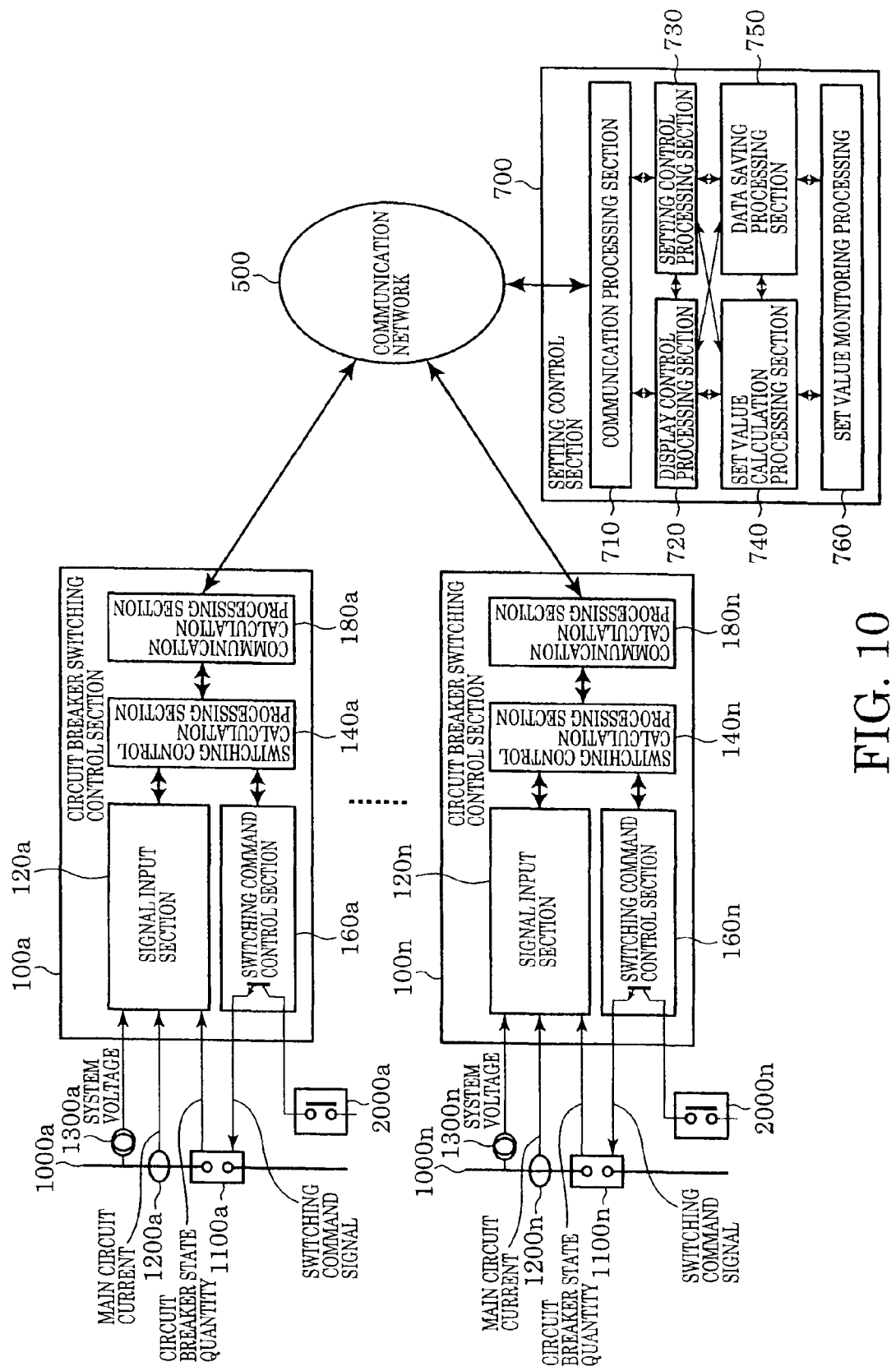
FIG. 10 is a system layout diagram of a circuit breaker switching control system according to a fifth embodiment of the present invention.

FIG. 10 is a system layout diagram of a circuit breaker switching control system according to a fifth embodiment of the present invention. The detailed construction of the circuit breaker switching control section 100 in FIG. 10 is the same as in the first embodiment, so further description thereof may be dispensed with. In the case of the setting control section 700 of FIG. 10, a set value monitoring processing section 760 is provided as a new structural element. Otherwise, the detailed construction of the setting control section 700 is the same as in the case of the first embodiment, so further description thereof may be dispensed with.

It should be noted that, in the same way as in the case of the second embodiment, a system layout employing a wireless communication network 600 may be employed as the communication means between the circuit breaker switching control section 100 and the setting control section 700. Also, just as in the case of the third embodiment, a system layout may be adopted in which a web server 800 is installed in the communication calculation MPU 181 of the communication calculation processing section 180 of the circuit breaker switching control section 100 and a web browser 810 is installed in the setting control section 700.

[Operation]

With the circuit breaker switching control system of the fifth embodiment, in addition to the same operations as in the case of the first to the fourth embodiments, the following operations are obtained. When the circuit breaker switching control section 100 executes synchronized switching control of the circuit breaker 1100, synchronized switching control-related data are transmitted from the circuit breaker switching control section 100 to the setting control section 700. The set value calculation section 740 of the setting control section 700 then performs recalculation of the set values, and saves the results in the data saving processing section 750.

The set value monitoring processing section 760 of the setting control section 700 monitors the recalculated set values saved in the data saving processing section 750. When the difference between the set value that is currently set in the circuit breaker switching control section 100 and the recalculated set value exceeds a preset threshold value, the user is notified of this fact and processing is performed to transmit the recalculated set value to the circuit breaker switching control section 100.

A construction may be adopted in which transmission processing of recalculated set values is performed automatically, or a construction may be adopted in which transmission is performed in accordance with a decision made by the user as to whether transmission is necessary or not. Also, a construction may be adopted in which the only items, of the recalculated set values, which are transmitted, are those deemed to be necessary by the user.

[Beneficial Effect]

With the circuit breaker switching control system according to the fifth embodiment, the same beneficial effects are obtained as in the case of the first to the fourth embodiments;

in addition, the following beneficial effects are also obtained. Regarding data such as the opening actuation time and closing actuation time and rate of decay of dielectric strength (RDDS), the set values of the synchronized switching control device must be revised in response to changes in the circuit breaker main unit over the years; in this embodiment, whether or not there is a need for revision of these data due to changes over the years is automatically detected and the user is notified accordingly. Consequently, updating of the set values in relation to these data can be performed easily and reliably and, as a result, stable, high-accuracy synchronized switching control can be implemented over a long period.

What is claimed is:

1. A circuit breaker switching control system comprising:
a circuit breaker switching control section; and
a setting control section connected through a communication network with said circuit breaker switching control section;
wherein said circuit breaker switching control section comprises:
  a signal input section that inputs at least one electrical quantity of a power system voltage or main circuit current, a circuit breaker state quantity, and at least one signal of a circuit breaker opening command signal or closure command signal;
  a switching control calculation processing section that calculates a delay time in respect of said power system voltage or a zero-cross point of said main circuit current, based on a circuit breaker switching actuation time and power system period, in order to interrupt or turn on a circuit breaker with a desired phase of said power system voltage or said main circuit current; and
  a switching command control section that outputs in respect of said circuit breaker opening command signal or closure command signal subjected to delay control in accordance with a delay time calculated by said switching calculation processing section;
and wherein said setting control section comprises:
  a setting control processing section that performs setting control, in respect of said circuit breaker switching control, of a set value that corrects said circuit breaker switching actuation time;
  a display control processing section of said set value set by said setting control processing section; and
  a set value calculation section that calculates said set value from a circuit breaker state quantity;
wherein said circuit breaker switching control section transmits said circuit breaker state quantity acquired by said signal input section through said communication network to said set value calculation section of said setting control section;
said set value calculation section of said setting control section calculates a set value to be set in said circuit breaker switching control section, using said circuit breaker state quantity that was transmitted thereto;
said setting control section transmits to said circuit breaker switching control section said set value calculated by said set value calculation section, through said communication network; and
said switching control calculation processing section provided in said switching control section of said circuit breaker corrects said circuit breaker switching actuation time in accordance with said set value and calculates a delay time in respect of said zero-cross point in accordance with corrected said circuit breaker switching actuation time and power system period;
wherein said set values include at least one of:
  a circuit breaker opening actuation time or closing actuation time;
  a circuit breaker rate of decay of dielectric strength;
  a temperature characteristic of said circuit breaker opening actuation time or closing actuation time;
  a control voltage characteristic of said circuit breaker opening actuation time or closing actuation time;
  an operating pressure characteristic of said circuit breaker opening actuation time or closing actuation time; and
  an actuation interval characteristic of said circuit breaker opening actuation time or closing actuation time;
wherein said setting control section calculates said set value of said circuit breaker switching control section corresponding to a circuit breaker of said same model, using a state quantity of two or more circuit breakers of said same model transmitted from two or more said circuit breaker switching control sections connected through said communication network.

2. The circuit breaker switching control system according to claim 1,
wherein part or all of said communication network that performs exchange of information between said circuit breaker switching control section and said setting control section is a wireless communication network.

3. The circuit breaker switching control system according to claim 1,
wherein said circuit breaker switching control section comprises communication calculation processing means for connection with said setting control section through said communication network, and incorporates a web server in respect of said communication calculation processing means.

4. The circuit breaker switching control system according to claim 1,
wherein said setting control section incorporates a web browser and said display control processing section and setting control processing section of said set values of said setting control section execute their processing by utilizing said web browser.

5. The circuit breaker switching control system according to claim 1, wherein:
said circuit breaker state quantities are a power system voltage peak value of a timing with which said circuit breaker is electrically turned on, a power system voltage phase of a timing with which said circuit breaker is electrically turned on, and a power system voltage phase of a timing with which said circuit breaker is mechanically closed; and
said set value calculation section calculates said circuit breaker rate of decay of dielectric strength from a gradient linking said power system voltage peak value and a difference between said power system voltage phase of a timing with which said circuit breaker is electrically turned on and said power system voltage phase of a timing with which said circuit breaker is mechanically closed.

6. The circuit breaker switching control system according to claim 5,
wherein said signal input section calculates a timing with which said circuit breaker is electrically turned on as a timing with which said main circuit current starts to flow.

7. The circuit breaker switching control system according to claim 5,
wherein said signal input section of said circuit breaker switching control section inputs a signal from a stroke sensor that outputs a signal corresponding to a position of a circuit breaker contact and calculates a timing with which said circuit breaker is mechanically closed in accordance with said output signal of said stroke sensor.

8. The circuit breaker switching control system according to claim 1,
wherein said setting control section has a set value monitoring processing section that, if a difference of said current set value of said circuit breaker switching control section and a newly calculated set value of said setting control section exceeds a preset range, gives notification of a result.

* * * * *